US009781356B1

(12) United States Patent
Banta et al.

(10) Patent No.: US 9,781,356 B1
(45) Date of Patent: Oct. 3, 2017

(54) PANORAMIC VIDEO VIEWER

(71) Applicant: Amazon Technologies, Inc., Seattle, WA (US)

(72) Inventors: William Christopher Banta, Lafayette, CA (US); Demir Selmanovic, Sarajevo (BA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 185 days.

(21) Appl. No.: 14/571,759

(22) Filed: Dec. 16, 2014

Related U.S. Application Data

(60) Provisional application No. 61/916,727, filed on Dec. 16, 2013.

(51) Int. Cl.
H04N 5/781 (2006.01)
G06F 3/00 (2006.01)
H04N 5/262 (2006.01)
G06F 3/0485 (2013.01)
G06F 3/0481 (2013.01)
H04N 9/68 (2006.01)

(52) U.S. Cl.
CPC ......... *H04N 5/2628* (2013.01); *G06F 3/0481* (2013.01); *G06F 3/0485* (2013.01); *G06F 3/04817* (2013.01); *H04N 9/68* (2013.01)

(58) Field of Classification Search
CPC ........... H04N 21/4728; H04N 5/23206; H04N 5/23296; H04N 21/4307; H04N 21/44008; H04N 5/23216; H04N 21/6587; H04N 1/6027; H04N 5/2628; H04N 5/3415; H04N 7/00; H04N 9/646; H04N 21/4858; H04W 52/0254; H04W 64/006; H04W 4/043; G06F 3/012; G06F 3/01; G06F 21/552; G06F 2203/0384; G06F 2221/2111; G06F 3/015; G06F 3/0231; G06F 3/0383; G06F 3/041; G06F 3/0481; G06F 3/04817; G06F 3/0482; G06F 3/0484; G06F 3/04842; G06F 3/04847; G06F 3/0485; G06F 3/0486; G06F 3/0488; G06F 3/04883
See application file for complete search history.

(56) References Cited

U.S. PATENT DOCUMENTS

| | | | |
|---|---|---|---|
| 5,319,465 A | 6/1994 | Squyres et al. | |
| 6,043,837 A | 3/2000 | Driscoll et al. | |
| 6,133,944 A | 10/2000 | Braun et al. | |
| 6,192,393 B1 | 2/2001 | Tarantino et al. | |
| 6,611,241 B1 | 8/2003 | Firester et al. | |
| 6,671,424 B1 * | 12/2003 | Skoll | G06T 1/60 382/305 |
| 6,788,333 B1 | 9/2004 | Uyttendaele et al. | |
| 7,324,664 B1 | 1/2008 | Jouppi et al. | |

(Continued)

*Primary Examiner* — Sultana M Zalalee
(74) *Attorney, Agent, or Firm* — K&L Gates LLP

(57) ABSTRACT

Various examples are directed to displaying a panoramic video at an interface comprising a focus region and a thumbnail region. The focus region may display an active field-of-view of the panoramic video, where the active field-of-view is a portion selected from the full field-of-view of the panoramic video. The thumbnail region may display a thumbnail version of the panoramic video comprising a thumbnail field-of-view that is equivalent to the full field-of-view. A distribution of color saturation levels of the thumbnail version may indicates a distribution of fields-of-view selectable from the full field-of-view.

20 Claims, 21 Drawing Sheets

(56) References Cited

U.S. PATENT DOCUMENTS

| | | |
|---|---|---|
| 8,334,905 B2 | 12/2012 | Bhan |
| 8,406,562 B2 | 3/2013 | Bassi et al. |
| 8,605,783 B2 | 12/2013 | El-Saban et al. |
| 8,687,070 B2 | 4/2014 | Chen et al. |
| 2002/0021353 A1 | 2/2002 | DeNies |
| 2002/0049979 A1 | 4/2002 | White et al. |
| 2002/0052674 A1* | 5/2002 | Chang ............... G06F 17/3087 700/300 |
| 2002/0067412 A1* | 6/2002 | Kawai .................. H04N 5/232 348/211.99 |
| 2002/0089587 A1* | 7/2002 | White .................. G11B 27/034 348/105 |
| 2003/0030678 A1* | 2/2003 | Rosenholtz ....... G06F 17/30855 715/838 |
| 2003/0043173 A1* | 3/2003 | Wasserman ........... G06F 3/1431 345/672 |
| 2003/0197785 A1* | 10/2003 | White ................. G11B 27/034 348/207.99 |
| 2004/0030527 A1 | 2/2004 | Rankin |
| 2004/0032495 A1 | 2/2004 | Ortiz |
| 2004/0264919 A1 | 12/2004 | Taylor et al. |
| 2005/0002535 A1 | 1/2005 | Liu et al. |
| 2005/0280701 A1 | 12/2005 | Wardell |
| 2006/0098889 A1* | 5/2006 | Luo ....................... G06T 7/0081 382/254 |
| 2006/0204142 A1* | 9/2006 | West ................. G06F 17/30864 382/305 |
| 2007/0013708 A1* | 1/2007 | Barcklay ........... G06F 17/30244 345/557 |
| 2007/0035612 A1 | 2/2007 | Korneluk et al. |
| 2009/0204913 A1* | 8/2009 | Kawano ............... G06F 3/04847 715/762 |
| 2009/0284601 A1 | 11/2009 | Eledath et al. |
| 2010/0034425 A1 | 2/2010 | Lin et al. |
| 2010/0040297 A1* | 2/2010 | Ohba ..................... G06T 11/00 382/232 |
| 2010/0050221 A1 | 2/2010 | McCutchen et al. |
| 2010/0299630 A1 | 11/2010 | McCutchen et al. |
| 2011/0214072 A1 | 9/2011 | Lindemann et al. |
| 2011/0261049 A1* | 10/2011 | Cardno ................. G06Q 10/10 345/419 |
| 2012/0057852 A1 | 3/2012 | Devleeschouwer et al. |
| 2012/0162362 A1 | 6/2012 | Garden et al. |
| 2013/0070047 A1 | 3/2013 | DiGiovanni et al. |
| 2013/0091432 A1* | 4/2013 | Shet ................. G08B 13/19645 715/719 |
| 2013/0141523 A1 | 6/2013 | Banta et al. |
| 2013/0141526 A1 | 6/2013 | Banta et al. |
| 2013/0328910 A1* | 12/2013 | Jones ..................... G09G 5/02 345/596 |
| 2014/0282264 A1* | 9/2014 | Han .................... G06F 3/04842 715/838 |
| 2016/0165309 A1* | 6/2016 | Van Brandenburg ..... H04N 21/4728 725/116 |

\* cited by examiner

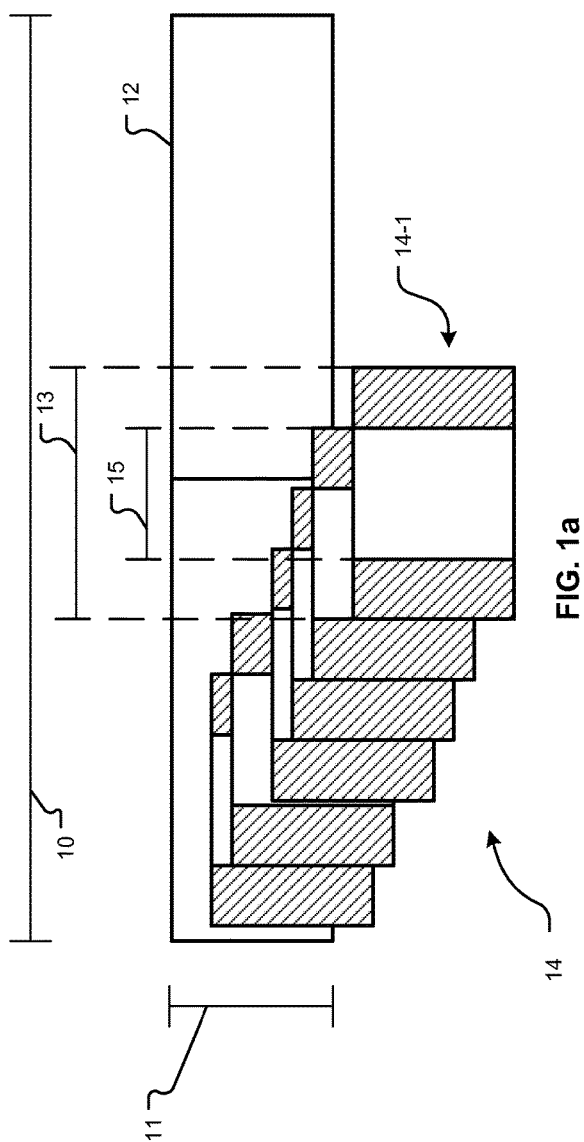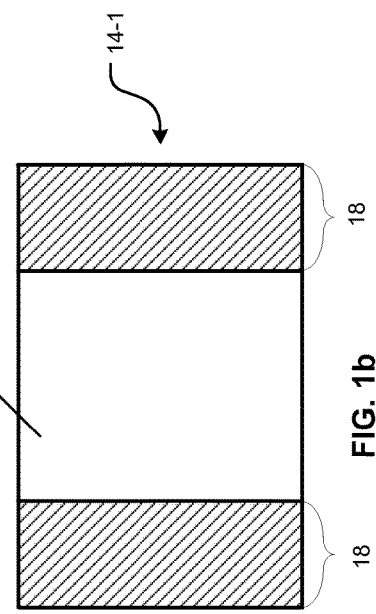
FIG. 1a
FIG. 1b

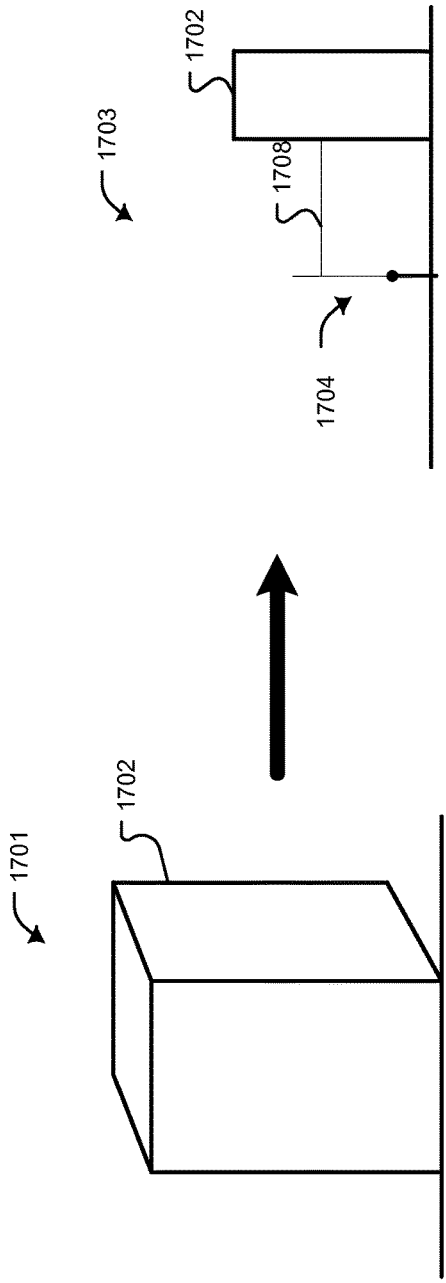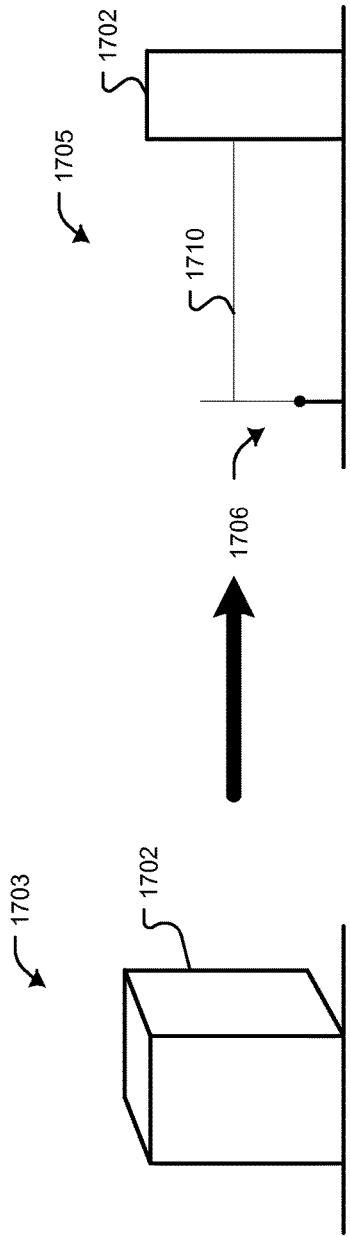
FIG. 21a
FIG. 21b

PANORAMIC VIDEO VIEWER

PRIORITY

This application claims the benefit of U.S. Provisional Patent Application Ser. No. 61/916,727 filed on Dec. 16, 2013, which is incorporated herein by reference in its entirety.

BACKGROUND

Current video streaming systems typically host a single video stream in a standard resolution and aspect ratio. This allows for video hosting services to stream a single video stream over existing network connections. Most network streaming infrastructures and hosting platforms have been optimized for single stream videos of this type.

Panoramic video is video with a panoramic field-of-view, or a field-of-view larger than standard aspect ratio videos. Some panoramic videos have 360° fields-of-view. Panoramic video is commonly created using a single wide-angle camera or by stitching together images from multiple cameras. Because panoramic videos have larger fields of view, they include more data than similar standard aspect ratio videos, sometimes significantly more data. For example, a panoramic video captured with five 1080p resolution cameras will have approximately five times the data of a standard aspect ratio 1080p video. Because of their size, panoramic videos require more bandwidth to stream, more host processing power to transmit and more host processing power to stream. Accordingly, there is a need for improved methods and systems for distributing and viewing panoramic video.

BRIEF DESCRIPTION OF DRAWINGS

FIG. 1a is a diagram showing one example of a panoramic video and corresponding tiles.

FIG. 1b is a diagram showing additional details of an example tile.

FIGS. 21a and 21b show scenes illustrating yet another example technique for determining three-dimensional information.

DETAILED DESCRIPTION

Figure 2:
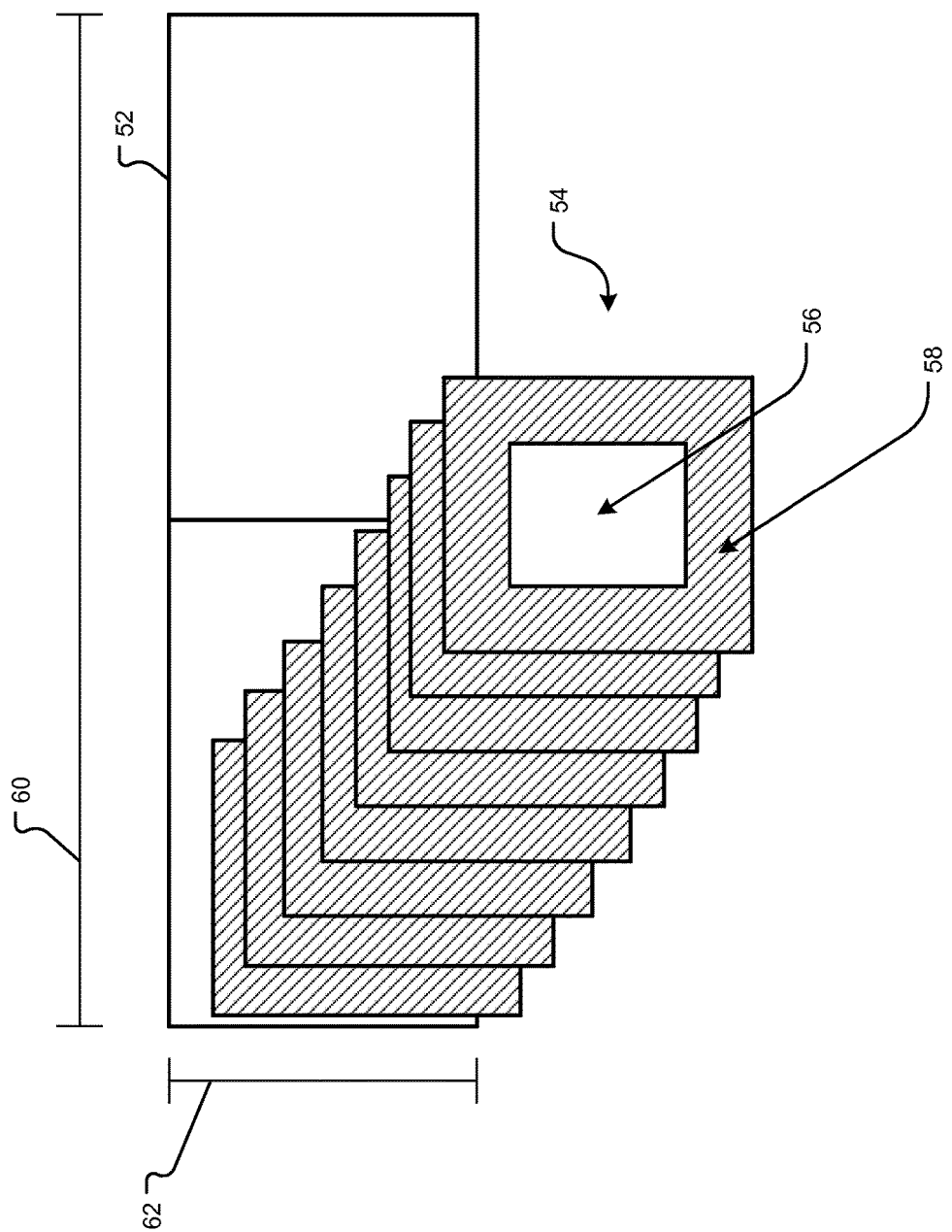
FIG. 2 is a diagram showing another example of a panoramic video and corresponding tiles where the mask area of the tiles extends around the central area.

In the following description, reference is made to the accompanying drawings which illustrate several embodiments of the present invention. It is understood that other embodiments may be utilized and various operational changes may be made without departing from the spirit and scope of the present disclosure. The following detailed description is not to be taken in a limiting sense, and the scope of the embodiments of the present invention is defined only by the claims of the issued patent.

Systems and methods in accordance with the embodiments described herein may utilize panoramic video that is broken into constituent pieces referred to herein as tiles. A panoramic video has a full field-of-view corresponding to the full area of the panoramic video (e.g. the full area of the frames making up the panoramic video). A single panoramic video may be broken into two or more tiles. Each tile is a separate video having a tile field-of-view that is a portion of the full field-of-view of the panoramic video. For example, each tile field-of-view represents an area selected from the full area of the panoramic video. A client device receives one or more of the tiles and uses the received tiles to display an active field-of-view.

In the context of a camera or other image-capturing device, field-of-view describes the portion of a scene that is visible to the image-capturing device. For example, the field-of-view of an image-capturing device may be expressed as an angle or an angular range. In the context of an image or video, field-of-view describes the portion of a scene that is reproduced in the image or video. Accordingly, the field-of-view of an image may be expressed as an area in the image. The field-of-view of a digital image or video, for example, may be expressed as a range of pixels.

FIG. 1a is a diagram showing one example of a panoramic video 12 and constituent tiles 14. The full field-of-view of the panoramic video 12 may comprise its total area, for example, the height 11 by the width 10. When the panoramic video 12 is digital, the height 11 and width 10 may be expressed in pixels. Any suitable number of pixels may make up the height 11 and width 10. For example, when the panoramic video 12 is stitched from the output of five high-resolution 1080p cameras, it may have a height of 1080 pixels and a width of approximately 9600 pixels. The height 11 and width 10 may correspond to any suitable camera field-of-view. For example, the width 10, in some examples, corresponds to a 360° camera field-of-view.

A single example tile 14-1 is shown in FIG. 1b at a larger size. Each tile 14 is a separate video having a tile field of view, which is a portion of the full field of view of the panoramic video 12. For example, each tile 14 may include a subset of the pixels making up the panoramic video 12. In the examples of FIGS. 1a and 1b, the tiles 14 have the same height 11 in pixels as the panoramic video 12. Accordingly, the tile field of view of the example tile 14-1 shown in FIG. 1a may be given as the width 13 by the height 11. The number and size of the tiles 14 may be determined based on various factors, including, for example, the video resolution, the bandwidth availability, a desired active field of view, a desired pan rate, device capabilities, etc.

Each tile 14 may comprise a central area 16 and one or more mask areas 18. For example, the tile field-of-view may be the sum of the central area 16 and the mask areas 18. The central area 16, in some examples is sized to correspond to an active field-of-view, which is a portion of the full field-of-view to be displayed. The size of the tile field-of-view may be determined, for example, based on the size of a viewport or window of a client device viewer interface. An example active field-of-view centered n the central area 16 of the tile 14-1 is shown in FIG. 1 as the width 15 by the height 11. In various examples, however, the same set of tiles 14 may be played with different sized active fields-of-view. In one example, when the panoramic video 12 and client-side viewer are configured for 1080p video, the central area 16 (and active field-of-view) may be 1080×1920 pixels. Any other suitable resolution may be used. The mask areas 18 may extend beyond the central area 16. Accordingly, when a single tile 14 is streamed to the client device viewer, a user may translate the active field-of-view within a tile 14 without the immediate need to access the adjacent tile 14. Translating the active field-of-view may be referred to herein as panning. The mask areas 18 of a tile 14 are positioned at the edge of the tile 14. At least a portion of the mask areas 18 (and sometimes also a portion of the central area 16) may overlap with adjacent tiles 14 to allow the client device to pan the active field-of-view between adjacent tiles without interrupting playback of the panoramic video 12.

FIG. 2 is a diagram showing another example of a panoramic video 52 and corresponding tiles 54 where the mask area 58 of the tiles 54 extends around the central area 56. For example, the panoramic video 52 and tiles 54 may be configured for use with an active field-of-view having a height less than a height 62 of the panoramic video 52 and a width less than a width 60 of the panoramic video.

Figure 3:
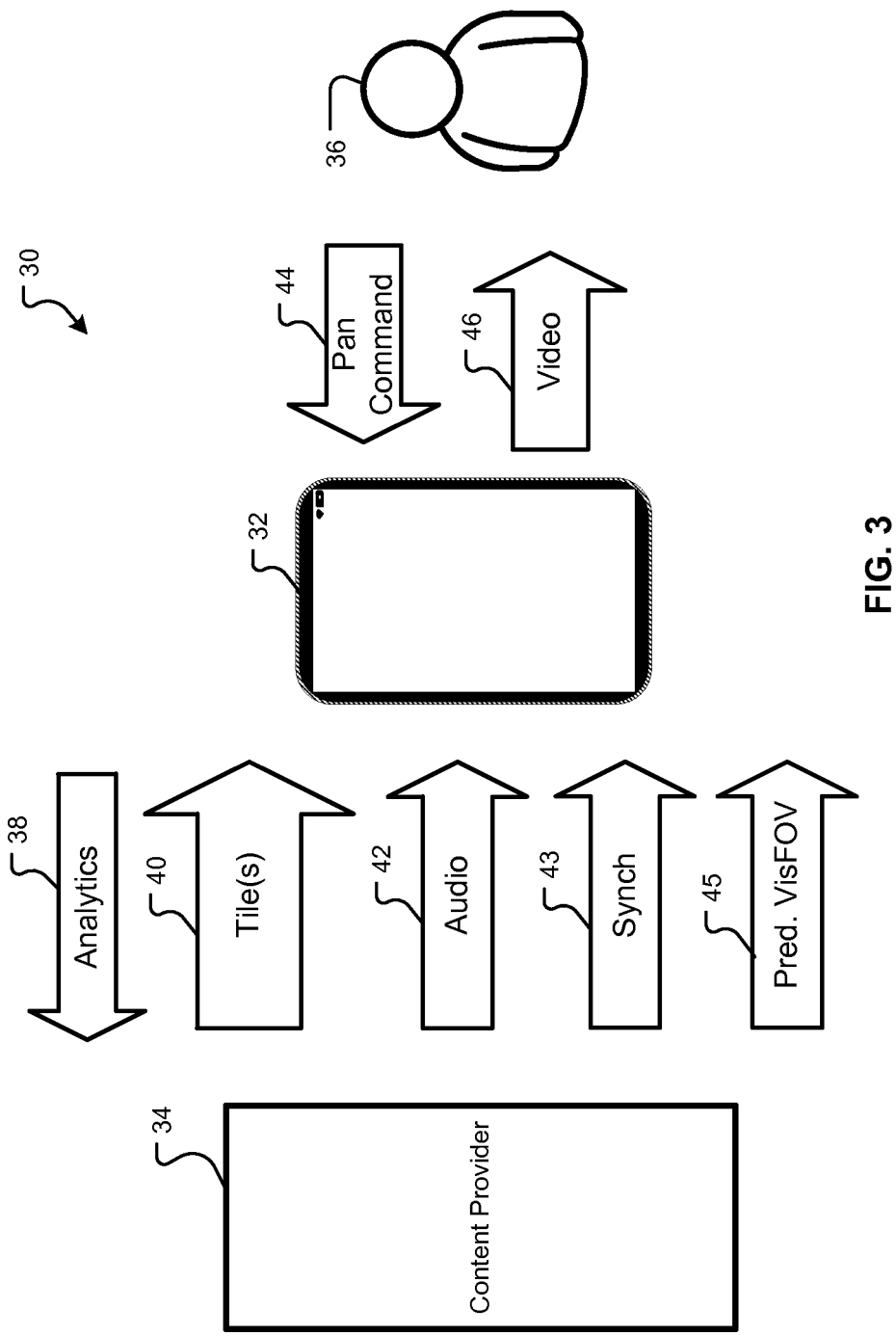
FIG. 3 is a diagram showing one example environment for distributing a panoramic video.

FIG. 3 is a diagram showing one example environment 30 for distributing a panoramic video. The environment 30 comprises a content provider 34, a client device 32, and a user 36. The content provider 34 may comprise one or more servers or other computer devices configured to store a panoramic video, such as the panoramic videos 12, 52 described in FIGS. 1a, 1b and 2. The content provider 34 may also transmit the panoramic video to the client device 32. In some examples, the content provider 34 may stream the panoramic video to the client device 32. According to streaming, the client device 32 may begin displaying the panoramic video (or a tile thereof) while the panoramic video (or tile) is still downloading to the device 32. The client device 32 may be any suitable type of computer device capable of receiving and displaying videos including, for example, a smart phone, a tablet computer, a laptop computer, a desktop computer, a dedicated video playback device, etc. In some examples, the client device 32 may be an augmented reality device, a virtual reality device, or any other system (e.g., a system that may be bandwidth constrained).

To play the panoramic video, the content provider 34 provides one or more tiles 40 to the client device 32. In some examples, the content provider 34 also provides the client device 32 with audio data 42 and synchronization data 43. Audio data 42 may include an audio track for the panoramic video. Synchronization data 43 may include data for matching the audio track of the panoramic video to the tiles 14. In some examples, the synchronization data comprises a thumbnail version of the panoramic video linked to the audio track. The thumbnail version of the panoramic video may have a thumbnail field-of-view that is equivalent to the full field-of-view of the panoramic video. Also, in some examples, the synchronization data comprises a frame counter linked to the audio data. In some examples, the content provider 34 also provides active field-of-view data 45 that may describe, for example, one or more predetermined fields-of-view, one or more active field-of-view distributions, etc.

The content provider 34 may provide the client device 32 with the tile or tiles 40 and, in some examples, a selected active field of view. The client device 32 may display the active field of view to the user 36 as video 46. For example, the client device 32 may execute a viewer (e.g., browser or other video-viewing application) that receives the tile or tiles and provides an interface that displays portions of the one or more tiles 40 using a screen or other display component of the client device 32. The viewer may have an interface or viewport that shows a defined number of pixels. In some examples, the viewport is the same size as the active field of view. Also, in some examples, the viewport is the same size as the central area of the tiles 40. The active field of view may be less than the tile field of view. This may allow the client device 32 to pan or translate the active field of view within a single tile 14. Pan commands, as described herein, may be generated by the content provider 34, the client device 32, and/or the user 36. For example, the user 36 may provide a pan command 44 to the client device 32, as described herein. In response, the client device 32 and/or content provider 34 may pan the video 12 (e.g., translate the active field of view). For example, the client device 32 and/or content provider 34 may execute a pan command by changing the portion of the tile 14 that is displayed and/or changing the tile 14 that is displayed.

In some examples, the client device 32 is configured to report the analytics 38 back to the content provider 34. For example, the client device 32 may open a WebSocket or other suitable connection to the content provider 34. Analytics 38 may include data describing the panoramic video, the user 36, and the user's particular playback experience with the panoramic video. For example, analytics 38 may comprise an identification of the panoramic video, an indication of the current navigation position in the panoramic video (e.g., frame number or time), an indication of the current active field-of-view, a geographic location of the client device 32, a screen resolution being utilized, an originating universal resource location (URL) of the client device 32 or viewer, etc. The content provider 34 may utilize the analytics, for example, to determine active field-of-view preferences for the panoramic video, as described herein.

Figures 4A, 4B:
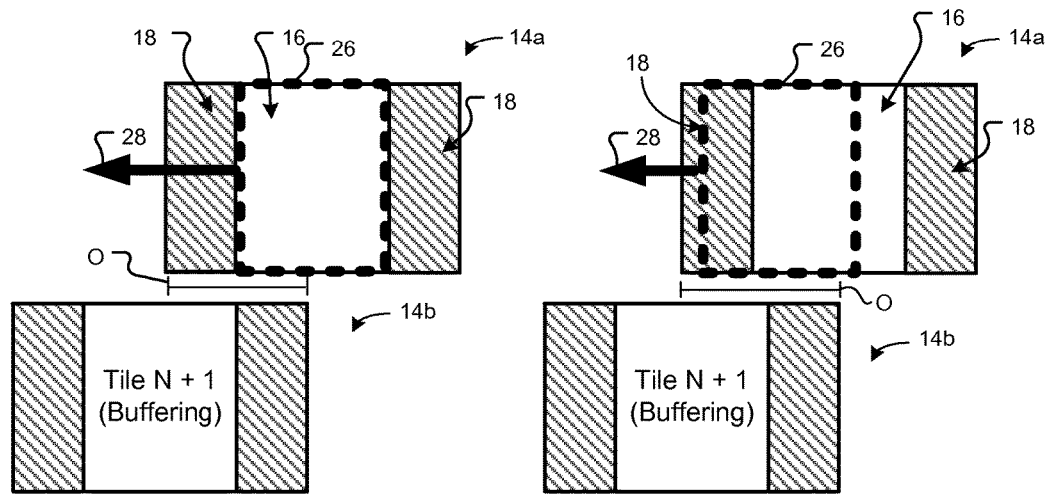
FIGS. 4a-4c are diagrams showing an example of panning the video within a first tile and across adjacent tiles.
Figure 4C:
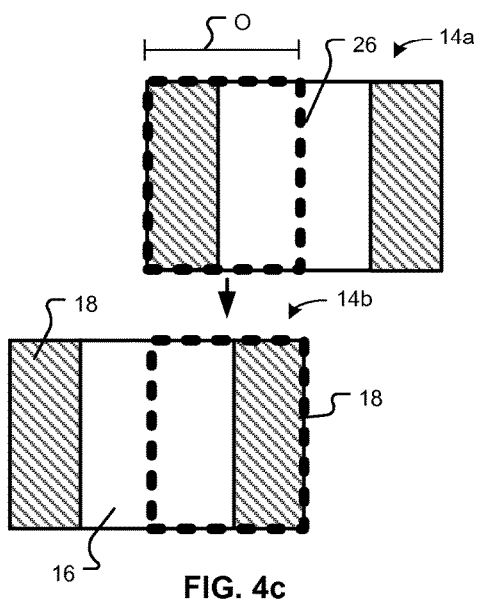

FIGS. 4a-4c are diagrams showing an example of panning a panoramic video within a first tile 14a and across adjacent tiles 14a, 14b. In FIGS. 4a-4c, the active field-of-view is indicated by the dashed box 26. In FIG. 4a, the active field-of-view 26 is initially positioned at the central area 16 of the first tile 14a. For example, the first tile 14a may be streamed to the client device 32, which may cause the central area 16 of the first tile 14a to be displayed at a viewer (e.g., an interface or viewport thereof). An example pan operation is initiated in the direction indicated by the arrow 28. The pan operation may be initiated automatically by the content provider 34 and/or manually in response to a pan command 44 from the user 36. To execute the pan operation, the client device 32 translates the active field-of-view 26 within the first tile 14a in the direction 28 of the pan, as shown in FIG. 4b. In other words, the client device 32 viewer displays a different part of the tile 14a. As the active field-of-view 26 is shifted within the first tile 14a, it may include a portion of a mask area 18 of the first tile 14a. In conjunction with the pan operation, the content provider 34 begins to send a second tile 14b to the client device 32. The second tile 14b may be adjacent to the first tile 14a in the direction of the panning operation. For example, the second tile 14b may have a tile field-of-view that is either adjacent to or overlapping the tile field-of-view of the first tile 14a in the full field-of-view of the panoramic video. Because the panning operation illustrated in FIGS. 4a-4c is to the left, the second tile 14b may be adjacent and to the left of the first tile 14a. As the second tile 14b is received by the client device 32, the client device 32 may the second tile 14b until the second tile 14b is ready to be played at the same point as the first tile 14a. Buffering the second tile 14b may comprise saving-ahead portions of the second tile 14b received from the content provider 34. The second tile 14b may be ready to be played when it has been saved far enough ahead of a current navigation position to allow continuous playback in view of current network conditions.

After the active field-of-view 26 is translated within the first tile 14a, the client device 32 may continue to buffer the second tile 14b if the buffering is not already complete. Either as part of the same pan operation or a subsequent pan operation also in the direction of the arrow 28, the active field-of-view 26 may be translated to a position that would be beyond the edge of the first tile 14a (e.g., the mask area 18 may be exhausted). When the active field-of-view 26 reaches the edge of the first tile 14a, the client device 32 may cease to display the first tile 14a and may begin to display the second tile 14b. Accordingly, the active field-of-view 26 shifts from the first tile 14a to the second tile 14b, as illustrated in FIG. 4c. When the first tile 14a is no longer displayed the client device 32 may cease buffering the first tile 14a and may delete any saved portions of the first tile 14a. This may increase the available storage space at the client device 32.

Figure 5:
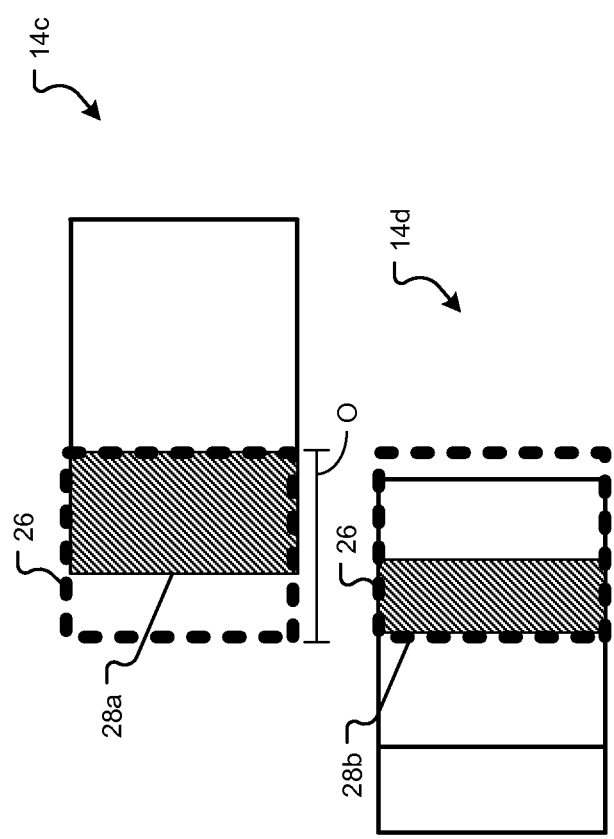
FIG. 5 is a diagram of the two adjacent tiles having an overlap that is less than the width of the viewport.

In FIGS. 4a-4c, the adjacent tiles 14a, 14b have an overlap (indicated as 0) with a width at least equal to the width of the active field-of-view 26. Accordingly, when the active field-of-view 26 reaches an edge of tile 14a, the client device 32 may cease to display the first tile 14a and begin to display the second tile 14b while maintaining the same active field-of-view 26 relative to the full field-of-view of the panoramic video. For example, the active field-of-view 26 may be positioned within the second tile 14b in the position indicated in FIG. 4c. In some examples, however, the overlap between adjacent tiles 14 may be reduced to less than the width of the active field-of-view 26. Accordingly, in some circumstances, the client device 32 may display portions from more than one tile 14 simultaneously. FIG. 5 is a diagram of the two adjacent tiles 14c, 14d having an overlap O that is less than the width of the active field-of-view 26. Accordingly, the active field-of-view 26 may extend past the edge of the tile 14c without being fully translatable to the adjacent tile 14d. Accordingly, the client device 32 may show the active field-of-view 26 by simultaneously displaying a portion 28a from the tile 14c and a portion 28b from tile 14d. For example, the client device 32 may iterate through equivalent frames of both tiles 14c, 14d. The frames may be stitched together, with a portion of the stitched tiles corresponding to the active field-of-view 26 being displayed. In some examples, the overlap O between adjacent tiles 14 may be indicated by a mask size and a tile offset.

Figure 6:
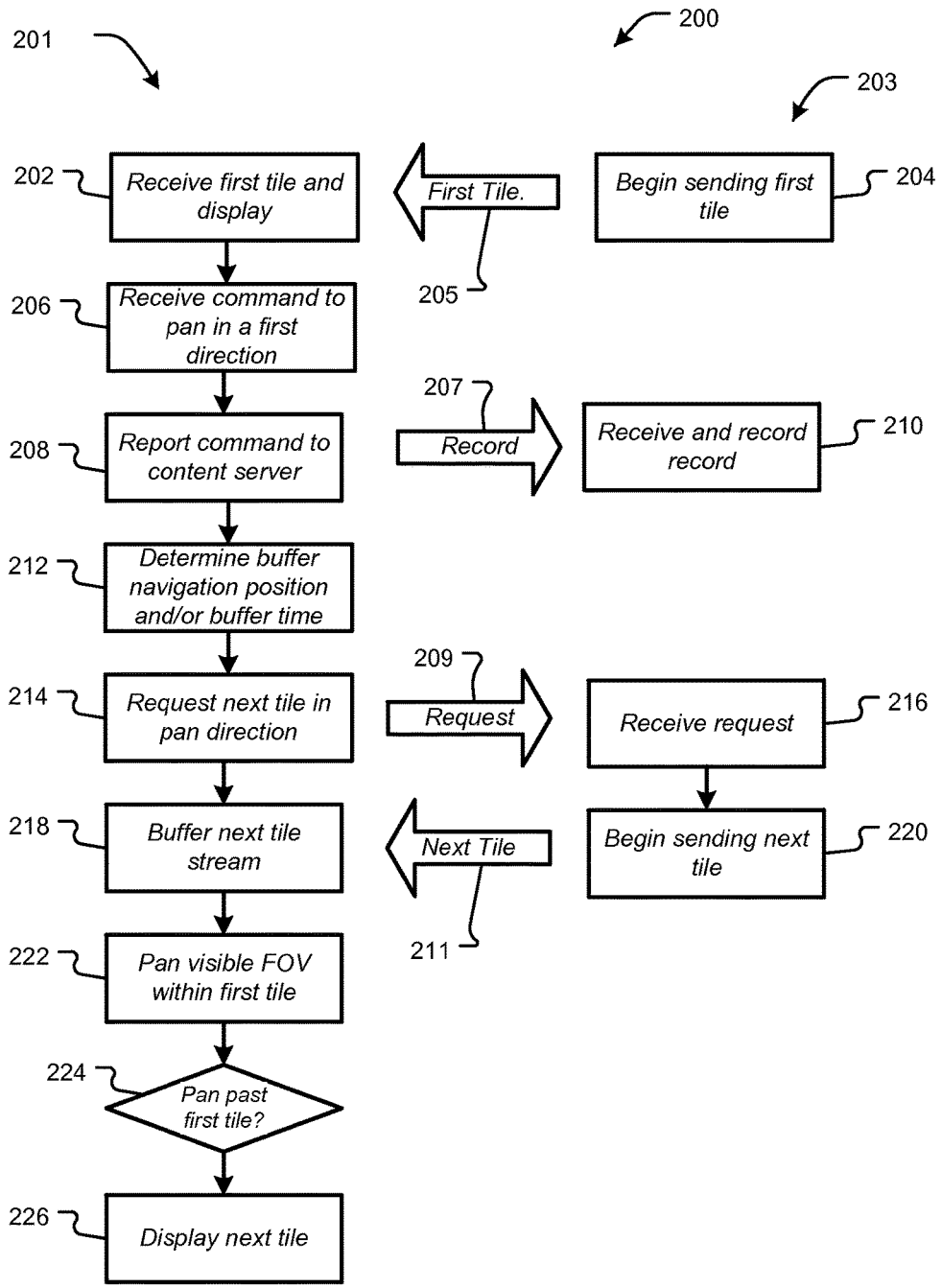
FIG. 6 is a flow chart showing an example process flow that may be executed by the content provider and client device to distribute and playback a panoramic video.

FIG. 6 is a flow chart showing an example process flow 200 that may be executed by the content provider 34 and client device 32 to distribute and playback a panoramic video. In the process flow 200, actions in column 201 may be performed by the client device 32 (e.g., a viewer executed by the client device 32). Actions in column 203 may be performed by the content provider 34. At 204, the content provider 34 may commence begin sending a first tile 205 of the panoramic video to the client device 32. The first tile may be provided at the beginning of the playback of the panoramic video or may be provided in response to a previous pan command. For example, if the first tile is provided at the beginning of the playback, it may be accompanied by an initial active field-of-view for display by the client device 32. At 202, the client device 32 may receive the first tile and commence playback (e.g., after buffering). In some examples, the first tile 205 may be streamed to the client device 32. For example, the client device 32 may begin displaying the first tile 205 before the entirety of the first tile 205 is received at the client device 32.

At 206, the client device 32 may receive from the user 36 a command 44 to pan or translate the active field-of-view in a first direction (FIG. 3). Optionally, the client device 32 may report a record 207 of the command and/or a resulting active field-of-view to the content provider 34 at 208. The content provider 34 may receive and record the record 207 at 210. For example, the content provider 34 may utilize the record 207 to generate active field-of-view statistics for the panoramic video. The active field-of-view statistics may be utilized to generate a predetermined active field-of-view, as described herein.

When a pan operation is executed, the client device 32 may begin to receive a next adjacent tile in the direction of the pan so that the client device 32 is prepared to switch the active field-of-view to the next tile if the pan takes the active field-of-view beyond the edge of the first tile. The client device 32, at 212, may determine a buffer time and buffer navigation position for the next tile.

The buffer time is an estimate of the time that will be required to buffer the next tile so that it is ready to be displayed at the client device 32. For example, the client device 32 may begin displaying a tile at an initial navigation position described by a frame number and/or a time (e.g., 0:32 into the tile). Buffering the next tile may include downloading enough frames ahead of the initial navigation position to allow continuous display of the tile from the initial navigation position without the need to display tiles that have not yet been streamed or sent to the client device 32. The buffer time may be determined based on any suitable factors including, for example, a previous load time, a seek delay, a bias, etc. In some examples, the buffer time may be determined as indicated by Equation (1) below:

$$\text{Buffer time} = \text{Previous load time} + \text{Seek Delay} + \text{Bias} \quad (1)$$

In Equation (1), previous load time may be the time that was required to buffer the first tile before playback began. In some examples, where more than one tile has been buffered and displayed, the previous load time may be an aggregation of load times over all or a portion of the previously buffered tiles (e.g., an average, a median, etc.). In some examples, the previous load time may be an aggregation of load times from recently buffered tiles such as, for example, the last N tiles buffered, tiles buffered within the last X seconds, etc. Seek delay may be an estimated time necessary for the client device 32 and/or the content provider 34 to find the location in the next tile where it should begin playback (e.g., the buffer navigation position described below). A bias time may be an error margin added to allow for network and other uncertainties. In some examples, the bias time may be determined based on actual errors experienced when buffering prior tiles. For example, if the first tile was expected to be buffered in 1000 milliseconds, but it actually took 1125 milliseconds, a bias may be 125 milliseconds, that is, the difference between the expected and actual buffer times. In some embodiments, the bias is an aggregation of actual errors experienced over multiple tiles (e.g., an average, a median, etc.). The aggregation may be taken over all or a subset of the previously buffered tiles. For example, bias may be an aggregation over recently buffered tiles such as, for example, the last N tiles buffered, tiles buffered within the last X seconds, etc. Equation (1) is just one example calculation for estimating the buffer time. Other methods may be used. In some examples, buffer time may be estimated as the average of a predetermined number of the most recent buffer times (e.g., the last two buffer times).

Also at 212, the client device 32 may determine the buffer navigation position for the next tile. In various examples, the active field-of-view is shifted from one tile to another in a manner that maintains a constant navigation position within the video. That is, if the first tile is at a first navigation position (e.g., a specific time or frame) and the active field-of-view is shifted to the next tile, the next tile may be at or about the same navigation position. In this way, playback continuity is maintained for the user 36 as the active field-of-view changes. Because of this, however, it may not be necessary to buffer the next tile from its beginning Instead, the next tile may be buffered from the first navigation position where the client device 32 may switch the active field-of-view to the next tile, referred to herein as the buffer navigation position. The buffer navigation position may be determined by adding the buffer time to the current navigation position of the currently playing tile, for example, according to Equation (2) below:

$$\text{Buffer navigation position} = \text{Current navigation position} + \text{Buffer time} \quad (2)$$

In various examples, navigation positions, such as the current navigation position and the buffer navigation position may be expressed as a frame number or a time. When the current navigation position is expressed as a frame number, finding the buffer navigation position may comprise finding a future frame of the currently displaying tile that would be displayed at a time equal to the current time plus the buffer time if the currently displaying tile were to continue being displayed. A frame of the next tile equivalent to the future frame of the currently displaying tile may indicate the buffer navigation position.

At 214, the client device 32 may request the next tile. The content provider 34 may receive the request 209 at 216. The request 209 may indicate the buffer navigation position. In response to the request 209, the content provider 34 may begin to send the next tile 211 to the client device 32. The content provider 34 may not provide all of the next tile 211 but may, instead, send only the frames of the next tile 211 after the buffer navigation position at 220. The next tile 211 may be received and buffered by the client device 32 at 218. In some embodiments, 214 and 216 may be omitted and the content provider 34 may initiate sending the next tile 211 in response to the record 207.

At 222, the client device 32 may pan or translate the active field-of-view within the first tile, for example, as illustrated above with respect to FIGS. 4a and 4b. In some examples, the client device 32 may modulate the rate of the pan to prevent the active field-of-view from reaching the edge of the first tile before the buffering of the next tile is complete, that is, the client device 32 may pan the active field-of-view at less than or equal to a pan rate limit. Some examples may utilize a linear pan rate limit. According to a linear pan rate limit, the client device 32 may determine the distance between the active field-of-view and the edge of the first tile. This distance-to-edge may be measured in pixels or any other suitable unit. The client device 32 may then apply a linear pan rate limit based on dividing the distance-to-edge by a remaining buffer time. The remaining buffer time may be the buffer time found at 212. If some time has elapsed since the buffering of the next tile has commenced, the remaining buffer time may be the total buffer time minus the elapsed time since the commencement of buffering. An example of a linear pan rate limit is provided by Equation (3) below:

$$\text{Linear pan rate limit} = \text{Pixels-to-edge}/\text{Remaining buffer time} \quad (3)$$

In Equation (3), pixels-to-edge is the determined number of pixels between the active field-of-view and the edge of the first tile. When the active field-of-view is in the center of the first tile and corresponds in size to the central area, the pixels-to-edge may be equal to the mask size. In addition to or instead of a linear pan rate limit, some examples may implement a progressive pan rate limit. According to a progressive pan rate limit, instead of maintaining a constant pan rate limit, the maximum allowable pan rate may be reduced as the active field-of-view approaches the edge of the first tile.

At 224, the client device 32 may determine whether the pan command calls for the active field-of-view to be translated past the edge of the first tile. As described with respect to 222, this may occur when the buffering of the next tile 211 is complete (e.g., the client device 32 has stored enough of the next tile 211 to allow it to begin displaying the next tile). If the active field-of-view is to translate past the edge of the first tile, the client device 32 may, at 226, display the next tile 211 beginning from a current navigation position of the first tile 205. The client device 32 may display all of the next tile 211 while ceasing to display the first tile 205 (as described herein with respect to FIG. 4c) or may display portions of the first tile 205 and the second tile 205 simultaneously, as described with respect to FIG. 5. As with all of the process flows described herein, the order of the actions of the process flow 200 may be varied. For example, determining the buffer navigation position at 212 and beginning buffering of the next tile at 218 and 220 may begin immediately after the pan command is received at 206 and/or may be executed in parallel with beginning the pan at 222.

Figure 7:
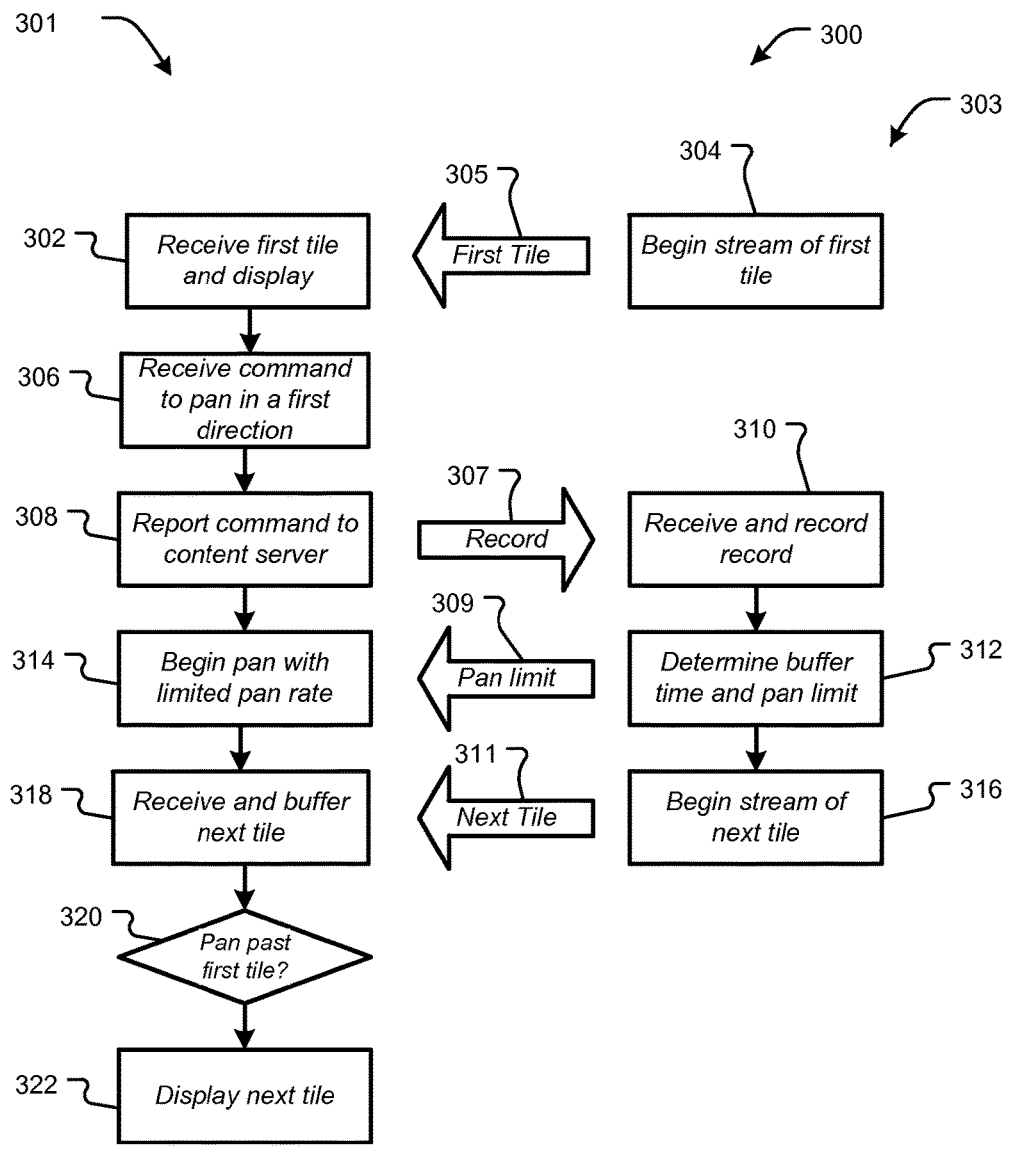
FIG. 7 is a flow chart showing another example process flow that may be executed by the content provider and client device to distribute and playback a panoramic video.

The process flow 200 shows just one example of how actions for distributing and playing back a panoramic video may be divided between the client device 32 (e.g., a viewer executed thereon) and the content provider 34. Any suitable division of actions may be used. For example, FIG. 7 is a flow chart showing another example process flow 300 that may be executed by the content provider 34 and client device 32 to distribute and playback a panoramic video. In the process flow 300, actions in column 301 may be performed by the client device 32 (e.g., a viewer executed by the client device 32). Actions in column 303 may be performed by the content provider 34.

In various examples, the client device 32 may initially request the video. At 304, the content provider 34 may commence to send a first tile 305 of the panoramic video to the client device 32. The first tile may be provided at the beginning of the playback of the panoramic video or may be provided in response to a previous pan command, similar to the pan command described herein below. At 302, the client device 32 may receive the first tile 305 and displaying the first tile 305. In some examples, the client device 32 may first buffer the first tile 305, or store enough of the first file to allow the client device 32 to play the first tile 305 without discontinuities due to network conditions. At 306, the client device 32 may receive from the user 36 a command 44 to pan in a first direction, similar to 206 described above. At 308, the client device 32 may report a record 307 of the received command to the content provider 34, similar to 208 described above. The record 307 may indicate the direction of the requested pan. The content provider 34 may receive and record the record 307 at 210. For example, the content provider 34 may utilize the record 307 to generate active field-of-view statistics for the panoramic video.

At 312, the content provider 34 may determine a buffer time, buffer navigation position, and/or pan rate limit, where, as described with respect to the process flow 200, the buffer time is an estimate of the time that it will take to buffer at the client device 32 a next tile adjacent to the first tile in the direction of the pan. The buffer time may be determined, for example, as described herein with respect to 212 above. The content provider 34 may also determine a pan rate limit, for example, based on the buffer time. The pan rate limit may be a linear or progressive limit, for example, as described herein. The pan rate limit 309 may be provided to the client device 32, which may begin to pan within the first tile with an appropriately limited pan rate at 314. At 316, the content provider 34 may begin to stream the next tile 311 to the client device 32, which may receive and buffer the next tile at 318. In some examples, buffering of the next tile may begin before the pan rate limit 309 is provided to the client device 32 and the pan begins at 314. At 320, the client device may determine whether the pan command 44 calls for the active field-of-view to be translated past the edge of the first tile and, if so, display the next tile at 322. This may be similar to 224 and 226 described herein above.

Figure 8:
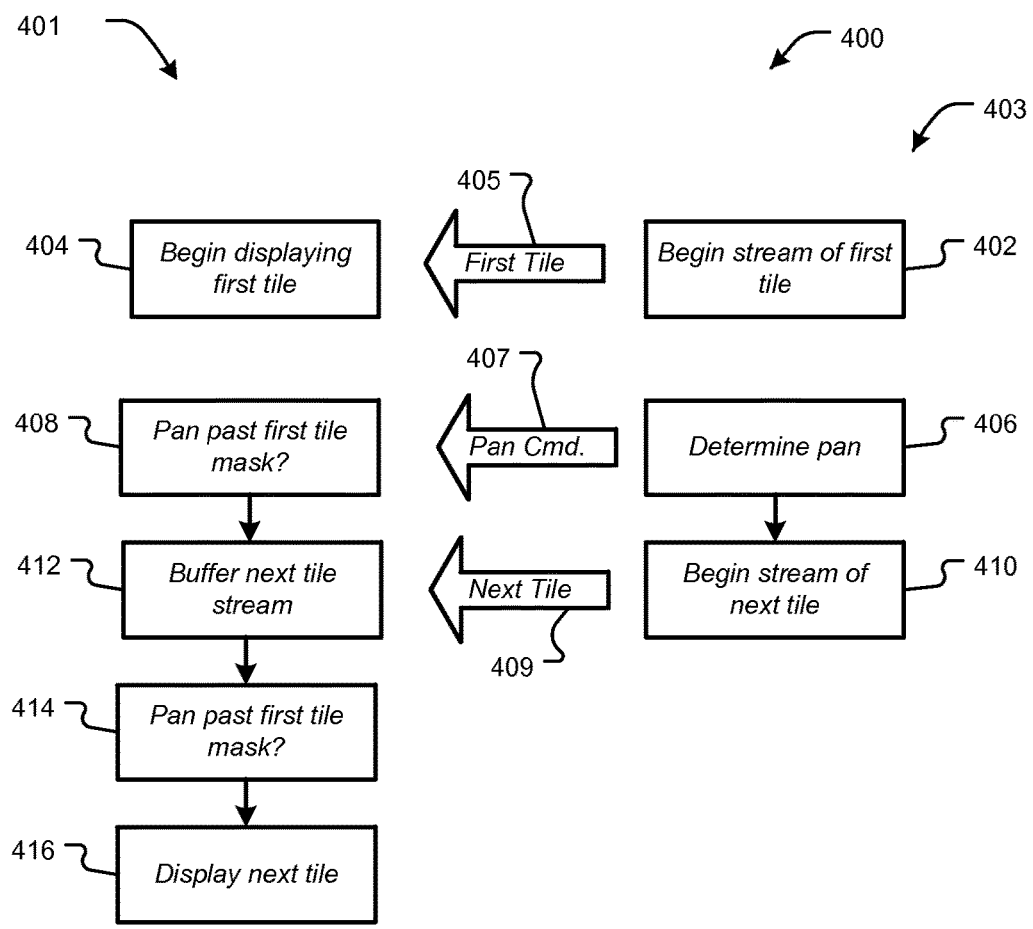
FIG. 8 is a flow chart showing one embodiment of a process flow that may be executed by the content provider and client device to distribute and playback a panoramic video according to a predetermined active field-of-view.

FIG. 8 is a flow chart showing one embodiment of a process flow 400 that may be executed by the content provider 34 and client device 32 to distribute and playback a panoramic video according to a predetermined active field-of-view. The predetermined active field-of-view may be determined in any suitable manner. For example, as described herein with respect to FIGS. 3 and 6-7, the client device 32 may provide the content provider 34 with analytics that may include pan commands received from the user 36 and/or with actual active field-of-view selected by the user 36 at different navigation locations in the panoramic video. The content provider 34 may aggregate this information over a large number of views of the video and determine an aggregated active field-of-view at each position in the panoramic video. The aggregated active field-of-view may be an average, median, or any other suitable aggregation across all of the considered users. In some examples, the aggregated active field-of-view is the predetermined active field-of-view. Also, in some examples, a predetermined active field-of-view may be determined by a person, algorithm, or other suitable mechanism and embedded within the panoramic video.

In the process flow 400, actions in column 401 may be performed by the client device 32 (e.g., a viewer executed by the client device 32). Actions in column 403 may be performed by the content provider 34. At 402, the content provider 34 may begin to send a first tile 405 to the client device 32. This may occur in response to any suitable stimulus including, for example, a request from the client device 32. The client device 32 may receive the stream of the first tile 405 and may begin displaying the first tile 405 at 404 (e.g., after buffering). At 406, the content provider 34 may derive a pan command 407 to be executed according to the predetermined active field-of-view and provide the pan command 407 to the client device 32. The pan command 407 may indicate a pan direction and a pan rate. For example, upon execution by the client device 32, the pan command 407, executed by the client device 32 at the pan rate, may cause the client device 32 to track the predetermined active field-of-view. The client device 32 may begin to execute the pan (e.g., within the first tile) at 408. If the pan 407 will require a next adjacent tile, the content provider 34 may begin, at 410, to send the next tile 409 to the client device 32. The client device 32 may receive the next tile 409 and begin buffering the next tile 409 at 412. Because the active field-of-view is predetermined, the navigation position at which the visible field-of-view will shift to the next tile according to the predetermined field-of-view is known. This may be the buffer navigation position. The content provider 34 may calculate a buffer time, for example, as described herein. The content provider 34 may subtract the buffer time from the navigation position to determine when to begin sending the next tile 409 to the client device 32. At 414, the client device 32 may translate the active field-of-view past the edge of the first tile. At 416, the client device 32 may begin displaying the next tile, for example, as described above with respect to 226 and 322. In various embodiments, predetermined active fields-of-view may be implemented in other ways. For example, a predetermined active field-of-view may be stored at the client device 32. The client device 32 may use pan commands to implement the predetermined active field-of-view, for example, as described herein with respect to FIGS. 6 and 7.

Figure 9:
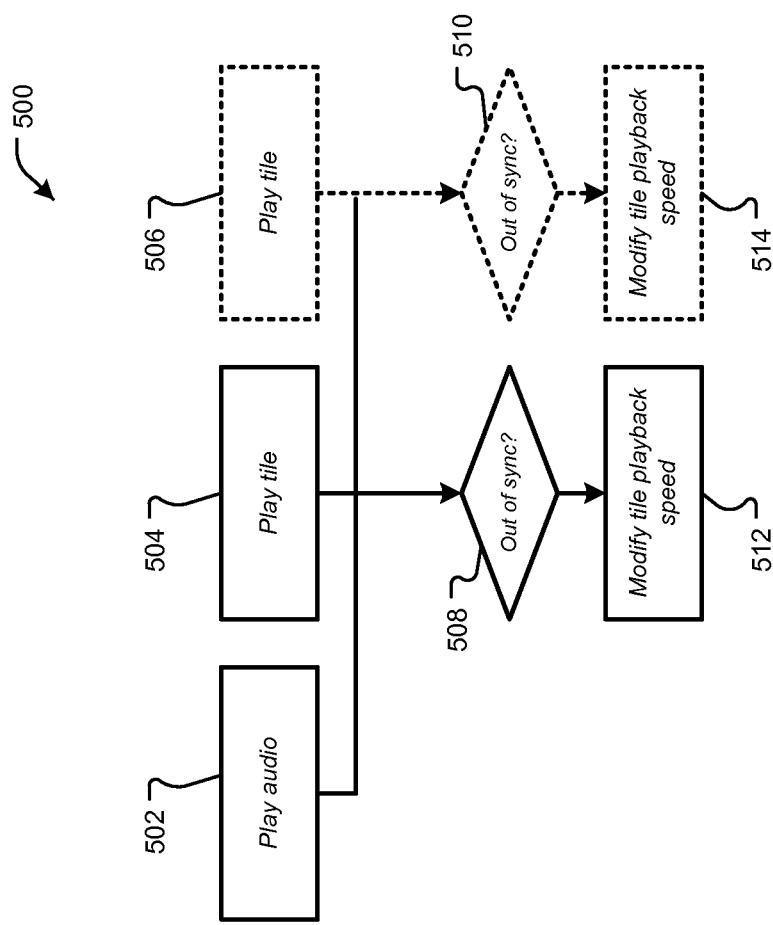
FIG. 9 is a flow chart showing one embodiment of a process flow for beginning playback of a panoramic video.

FIG. 9 is a flow chart showing one embodiment of a process flow 500 for incorporating audio into a panoramic video. The client device 32 (or a viewer thereof) may play an audio track for the panoramic video at 502 and display a tile from the panoramic video at 504. Playback of the audio track and the tile may be synchronized, for example, based on synchronization data. For example, the synchronization data may tie navigation positions in the audio track to corresponding navigation positions in the various tiles. Sometimes, during playback, a tile may fall out of synchronization with the audio track. Accordingly, at 508, the client device 32 may determine whether the tile has fallen out of synchronization with the audio track utilizing the synchronization data. For example, when the synchronization data comprises a frame counter linked to the audio track, the client device 32 may determine whether the frame indicated by the frame counter matches the current frame of the tile (or is within an acceptable threshold thereof). When the synchronization data is a thumbnail version of the panoramic video, the client device 32 may display the thumbnail version of the video and audio and resolve synchronization problems by determining whether the current frame of the thumbnail matches the current frame of the tile (or is within an acceptable threshold thereof).

If the tile is not out of synchronization with the audio track, the client device 32 may continue to play the audio track 502 and to display the tile 504. If the tile is out of synchronization with the audio track, the client device 32 may modify the playback speed of the tile, at 512, until the current frame of the tile matches or is within an acceptable threshold of synchronization data. For example, modifying the speed of the tile may be less disruptive to the viewer than modifying the speed of the audio track. As described above, there may be circumstances where the client device 32 displays two tiles simultaneously, for example, as described above with respect to FIG. 5. For example, a second tile may be played at 506. In such cases, the client device 32 may monitor the synchronization of the second tile at 510. If the second tile is out of synchronization, the client device 32 may modify its playback speed, at 514, until the current frame matches or is within an acceptable threshold of the current frame of the synchronization data.

Figure 10:
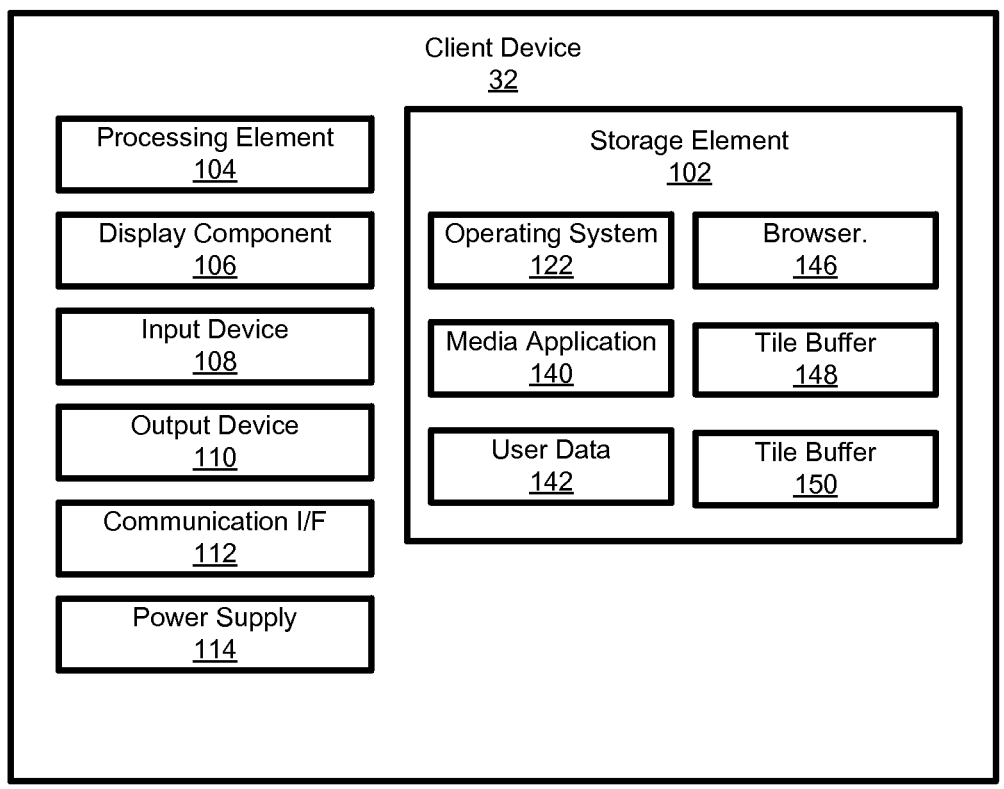
FIG. 10 is a block diagram showing additional details of an example client device.

FIG. 10 is a block diagram showing additional details of an example client device 32. The client device 32 may include a display component 106. The display component 106 may comprise, for example, one or more devices such as cathode ray tubes (CRTs), liquid crystal display (LCD) screens, gas plasma-based flat panel displays, LCD projectors, or other types of display devices, etc. The client device 32 may also include one or more input devices 108, operable to receive inputs from the user 36. Inputs from the user may include, for example, pan commands 44 (FIG. 3). The input devices 108 can include, for example, a push button, touch pad, touch screen, wheel, joystick, keyboard, mouse, trackball, keypad, accelerometer, light gun, game controller, or any other such device or element whereby a user can provide inputs to the client device 32. These input devices 108 may be incorporated into the client device 32 or operably coupled to the client device 32 via wired or wireless interface. For computing devices with touch-sensitive displays, the input devices 108 can include a touch sensor that operates in conjunction with the display component 106 to permit users to interact with the image displayed by the display component 106 using touch inputs (e.g., with a finger or stylus).

The client device 32 may also include at least one communication interface 112, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the client device 32 may also include one or more wired communications interfaces for coupling and communicating with other devices. The client device 32 may also include a power supply 114, such as a wired alternating current (AC) converter, a rechargeable battery operable to be recharged through conventional plug-in approaches, or through other approaches such as capacitive charging.

The client device 32 also includes one or more processing elements 104 for executing instructions and retrieving data stored in a storage element 102. The storage element 102 can include one or more different types of memory, data storage or computer-readable storage media devoted to different purposes within the client device 32. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may store software for execution by the processing element 104, such as operating system 122. Additionally, the storage element 102 may comprise executable elements that may be executed by the processing element 104 to implement a viewer. The viewer may receive and provide an interface or viewport to display panoramic videos as described herein. In some examples, the storage element 102 may comprise a browser 146. The browser 146 may be executed by the processing element 104. In various examples, the browser 146 is configured to access an external web page comprising elements (e.g., Hypertext Markup Language (HTML) elements) for implementing a viewer. In some examples, the browser 146 may download and execute a Web application for implementing a viewer. In some examples, the storage element 102 may comprise a media application 140. The media application 140 may be executed by the processing element 104 in addition to or instead of the browser to implement a viewer for panoramic video. The storage element 102 may also comprise one or more tile buffers 148, 150 for buffering tiles 14 received from the content provider 34. For example, a first tile buffer 148 may be utilized to buffer a currently viewed tile 14 while an additional tile buffer 150 may be used to buffer a tile 14 adjacent to the currently viewed tile 14. Although two tile buffers 148, 150 are shown, more or fewer tile buffers may be used. In some examples, tile buffers are stored in a random access memory (RAM) or other low-latency media of the storage element 102.

Figure 11:
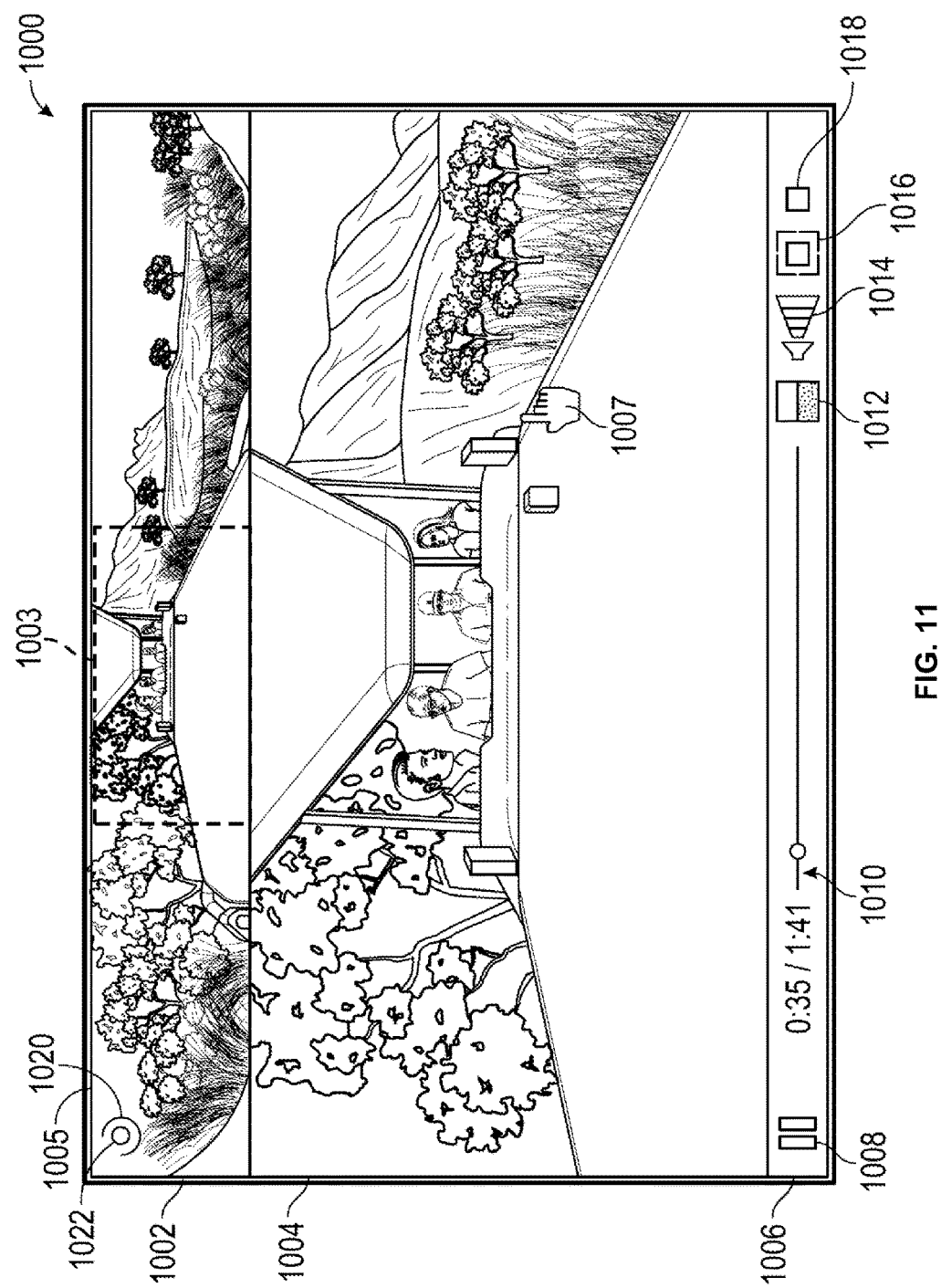
FIG. 11 is a screenshot showing one example interface that may be provided to the user by the client device to display panoramic video.

According to various embodiments, the viewer executed by the client device 32 may provide an interface for displaying the panoramic video to the user 36. FIG. 11 is a screenshot showing one example interface 1000 that may be provided to the user 36 by the client device 32 to display panoramic video. For example, the interface 1000 may be provided by a viewer application (e.g., browser 146 or media application 140) and shown on the display component 106 of the client device 32.

In the example of FIG. 11, interface 1000 comprises three regions 1002, 1004, 1006. A thumbnail region 1002 displays a thumbnail version of the panoramic video. The thumbnail version may comprise a large thumbnail field-of-view (e.g., larger than the active field-of-view). In some examples, the thumbnail field-of-view is equivalent to the full field-of-view of the panoramic video, although the thumbnail version may be at a lower resolution than the full panoramic video. For example, the area represented by the thumbnail field-of-view may be the same area represented by the full field-of view, although the thumbnail version may comprise fewer pixels. Accordingly, the thumbnail version may be sent to the client device 32 utilizing less network bandwidth than would be used if the full panoramic video were to be sent. A focus region 1004 may display the active field-of-view, as described herein. For example, the size of the focus region 1004 may correspond to the size of the active field-of-view and the client device 32 may populate the focus region 1004 as described herein. A navigation region 1006 may comprise tools for navigating the video. For example, a play/pause button 1008 may be selectable by the user 36 to alternately play or pause the panoramic video. A navigation position field 1010 may indicate the current playback position in panoramic video indicated, for example, in FIG. 11 as a current time, a total time, and a slider bar. In some examples, the slider bar is selectable by the user 36 to navigate within the video. A thumbnail region switch 1012 may be selectable by the user 36 to alternately activate and de-activate the thumbnail region 1002. A volume slider 1014 may be selectable by the user 36 to change the volume of the audio track. A screen-size button 1016 may be selectable by the user 36 to transition the interface 1000 to and from a full-screen mode. A social media button 1018 may be selectable by the user to share the video on a social media platform such as, for example, FACEBOOK, TWITTER, etc.

In some examples, such as examples where the viewer is executed through the browser 146 of the client device 32, the viewer may be a web application coded according to a scripting language such as JavaScript. The various regions 1002, 1004, 1006 may be implemented as elements of the web application and may be expressed, for example, in Hypertext Markup Language (HTML) or another suitable syntax. Viewers, according to various examples, may utilize the displayed regions 1002, 1004, 1006 in different orientations and configurations. Also, some viewers may omit one or more of the regions 1002, 1004, 1006 and/or add other regions not shown as part of the example interface 1000.

The interface 1000 may comprise various tools for monitoring and modifying the active field-of-view displayed at the focus region 1004. For example, the thumbnail region 1002 may comprise a field-of-view outline 1003. The field-of-view outline 1003 may be placed at a location in the thumbnail field-of-view corresponding to the active field-of-view displayed at the focus region 1004. For example, the field-of-view outline 1003 may indicate the active field-of-view. A field-of-view icon 1005 may also indicate the active field-of-view. For example, the field-of-view icon 1005 comprises an arc 1020 positioned around a dot 1022. The subtending angle of the arc 1020 may indicate the subtending angle of the active field-of-view. The angular position of the arc 1020 relative to the dot 1022 may indicate the position of the active field-of-view relative to the full field-of-view of the panoramic video. The field-of-view icon 1005 may be positioned at any suitable position in the interface 1000 including, for example, the thumbnail region 1002 as illustrated and focus region 1004.

The interface 1000 may also comprise various features allowing the user 36 to send pan commands. For example, the field-of-view outline 1003 may be selectable and draggable within the thumbnail region 1002. Selecting and dragging the field-of-view outline 1003 from a first position within the thumbnail version of the panoramic video to a second position may represent a pan command to change the active field-of-view to the field-of-view corresponding to the second position. Also, in some examples, the arc 1020 of the field-of-view icon 1005 may be selectable and draggable around dot 1022. Changing the position of the arc 1020 from a first angular position about the dot 1022 to a second angular position may represent a pan command to change the active field-of-view to the field-of-view corresponding to the second angular position. In some examples, such as examples where the viewer is a web application executed through a browser, pan commands may be generated by invoking commands (e.g., JavaScript commands) of the viewer from an external script (e.g., a script executed by the client device 32.

Figure 12:
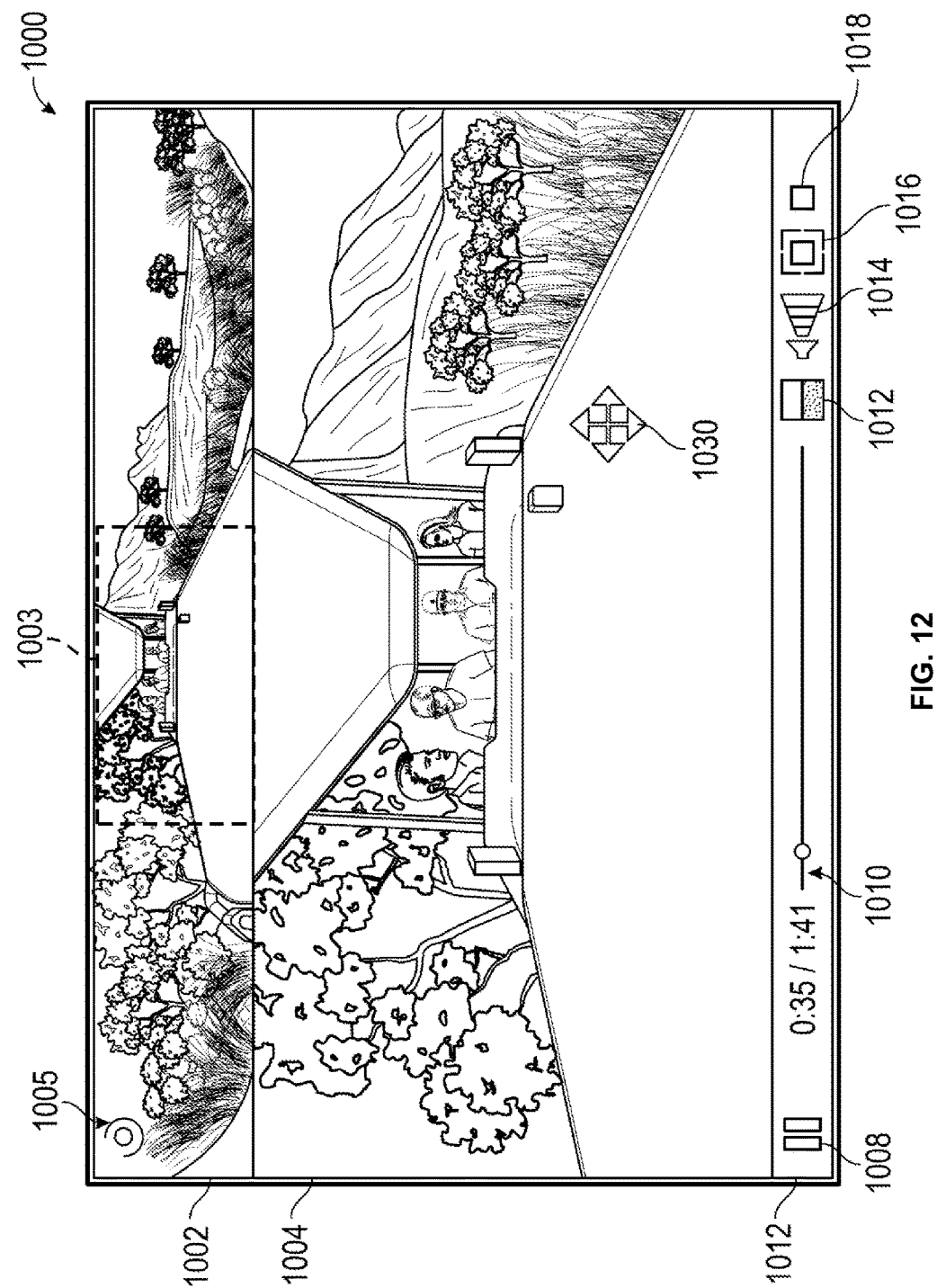
FIG. 12 is a screenshot showing another example of the interface of FIG. 11 including additional features.

In various examples, the interface further comprises a cursor 1007 that may be movable about the interface in response to commands from the user 36 received via an input device 108 of the client device 32. For example, the cursor 1007 may be utilized to select and modify the field-of-view outline 1003 and the field-of-view icon 1005, as described above. In some embodiments, the cursor 1007 may be used to select a point on the thumbnail version of the panoramic video from the thumbnail region 1002. This may represent a pan command to change the active field-of-view to a field-of-view at or around the selected point. Also, in some examples, the cursor 1007 may be used to select and drag a point in the focus region 1004, for example, to the left or right. This may represent a pan command in the direction of the drag. FIG. 12 is a screenshot showing another example of the interface 1000 including additional features. For example, FIG. 12 comprises a locked cursor 1030. For example, the cursor 1007, shown in FIG. 11, may be placed over the focus region 1004 and selected to provide the locked cursor 1030. When the locked cursor 1030 is displayed, further user input received via the input device 108, instead of moving the cursor 1030, may instead represent a pan command in the direction of the motion.

Figure 13:
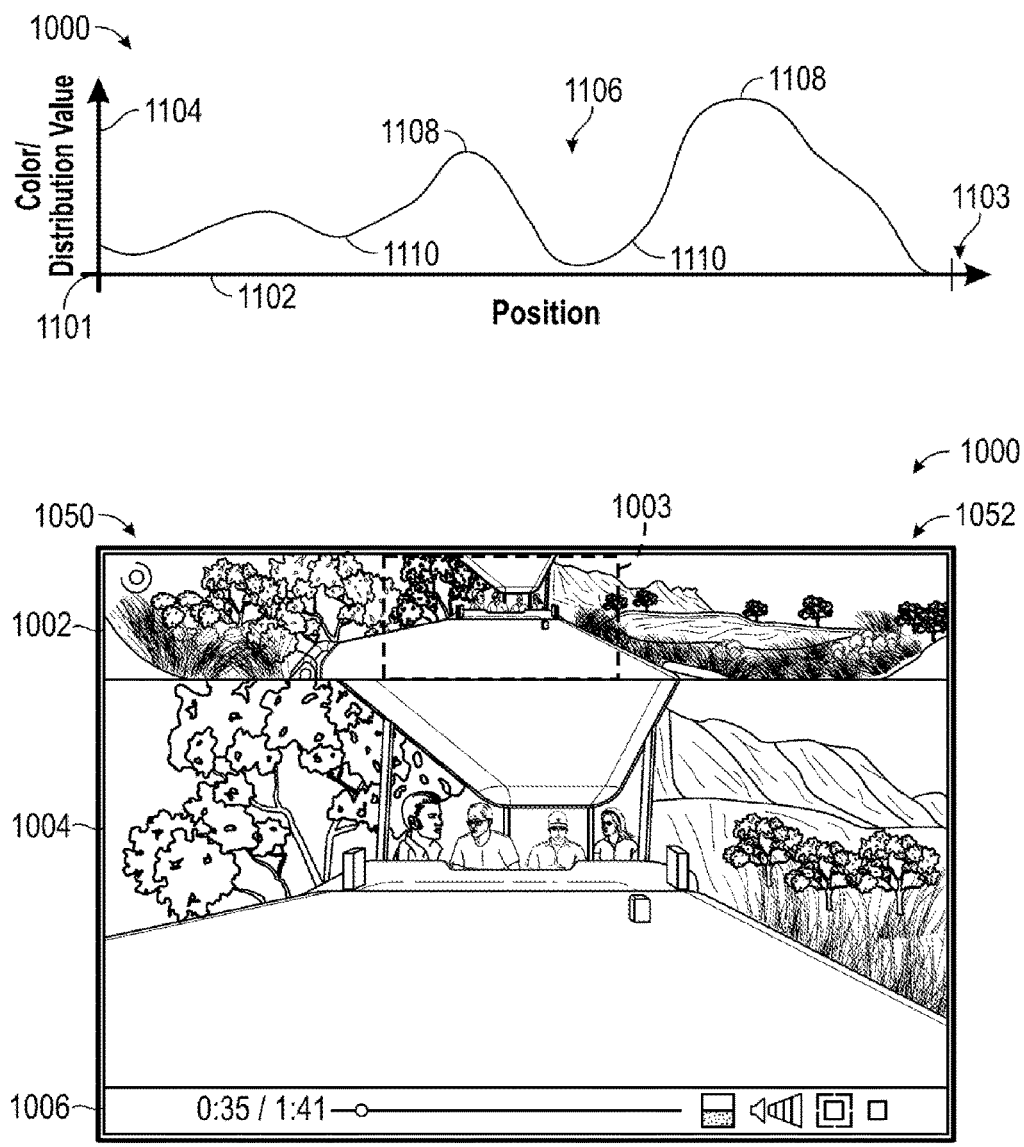
FIG. 13 is a screenshot showing another example of the interface where a distribution of color saturation levels in the thumbnail version of the panoramic video matches a distribution of fields-of-view selectable from a thumbnail field-of-view of the thumbnail version.

FIG. 13 is a screenshot showing another example of the interface 1000 where a distribution of color saturation levels in the thumbnail version of the panoramic video indicates a distribution of fields-of-view selectable from a thumbnail field-of-view of the thumbnail version. For example, multiple potential active fields-of-view are selectable from the thumbnail field-of-view. This is illustrated by the field-of-view outline 1003. The field-of-view outline 1003, as described above, indicates the area of the thumbnail field-of-view that corresponds to the active field-of-view currently displayed at the focus region 1004. Each potential position of the field-of-view outline 1003 within the thumbnail field-of-view corresponds to a potential field-of-view that is selectable from the thumbnail field-of-view. When the thumbnail field-of-view is equivalent to or less than the full field-of-view of the panoramic video, fields-of-view selectable from the thumbnail field-of-view may also be selectable from the full field-of-view. When the thumbnail field-of-view is equivalent to the full field-of-view, all fields-of-view selectable from the full field-of-view may also be selectable from the thumbnail field-of-view.

In some examples, the distribution of selectable fields-of-view represented by the distribution of color saturation levels in the thumbnail version may be a distribution of fields-of-view actually selected (e.g., as the active field-of-view) during previous displays of the panoramic video. In some examples, the distribution of selectable fields-of-view may be generated by a human or computer, for instance, to indicate portions of the thumbnail field-of-view that may be of interest to the user 36. In some examples, the distribution of selectable fields-of-view may reflect fields-of-view selected during previous displays of the panoramic video as well as human or computer-generated fields-of-view.

As illustrated in FIG. 13, each position in the thumbnail field-of-view from left (1050) to right (1052) has a color saturation level, indicated by the plot 1106, that corresponds to the value for the distribution of selectable fields-of-view at the same position. For example, the color saturation level at each position in the thumbnail field-of-view may be proportional to the value for the distribution at that position.

The plot 1106 is illustrated on a chart 1100 having a horizontal or position axis 1102 that indicates positions within the thumbnail field-of-view. For example, the axis 1102 from the origin 1101 to point 1103 corresponds to the thumbnail field-of-view as displayed at the thumbnail region 1002 from left (1050) to right (1052). The vertical axis 1104 of the chart 1100 indicates color saturation levels as well as values on the distribution of selectable fields-of-view (distribution values). Color saturation levels may range from black and white or greyscale (at the origin 1101) to higher color saturations. Distribution values may range from zero to any suitable number. For example, a position on the axis 1102 may have a value of zero if the distribution indicates no selectable fields-of-view incorporating that position. Peaks 1108 of the plot 1106 indicate positions in the thumbnail field-of-view corresponding to relatively higher distribution values and having relatively higher color saturation levels. Troughs of the plot 1106 indicate positions in the thumbnail field-of-view corresponding to relatively lower distribution values and having relatively lower color saturation levels. In some examples, different navigation positions (e.g., frames) in the panoramic video may have different color saturation levels determined according to different distributions of selectable fields-of-view. Also, although distribution values and color saturation levels in FIG. 13 vary only in one dimension (e.g., along axis 1102), in some examples, distribution values and color saturation levels may vary in more than one dimension (e.g., in two dimensions, in three dimensions, etc.).

The client device 32 and/or content provider 34 may set the color saturation levels of the thumbnail version in any suitable manner. For example, the client device 32 and/or content provider 34 may apply a color-gradient mask to the thumbnail version. The color-gradient mask may indicate a desired color saturation level for each position in the thumbnail field-of-view. The desired color saturation level may be expressed as a portion or percentage of an original color saturation at the position (e.g., the color saturation at the position in the un-modified thumbnail version). The color-gradient mask may comprise a desired color saturation for each position in the thumbnail field-of-view. Accordingly, in the example shown in FIG. 13, the color-gradient mask may comprise a single dimension (e.g., along the horizontal axis 1102). In examples where the distribution values and/or color saturation levels vary in additional dimensions, the color-gradient mask may comprise additional dimensions. The color-gradient mask may be applied to the thumbnail version of the panoramic video to generate the thumbnail region 1002 illustrated in FIG. 13.

When the color-gradient mask is applied to a thumbnail version of the panoramic video, the client device 32 and/or content provider 34 may modify the color saturation of each pixel to a percentage of the pixel's original color saturation according to the value of color-gradient mask at the position of the pixel. The color saturation of the pixels may be modified in any suitable manner. For example, the client device 32 and/or content provider 34 may modify the red, green, blue (RGB) value of the pixels to match the desired color saturation in any suitable manner. In some examples, the RGB value for each pixel may be expressed as (or translated to) a cylindrical coordinate representation having color saturation as a term. Examples include hue-saturation-lightness (HSL) or hue-saturation-value (HSV). The saturation term may be modified according to the color-gradient mask value at the position of the pixel. The new value may be maintained in HSL or HSV format or re-converted to RGB.

Figure 14:
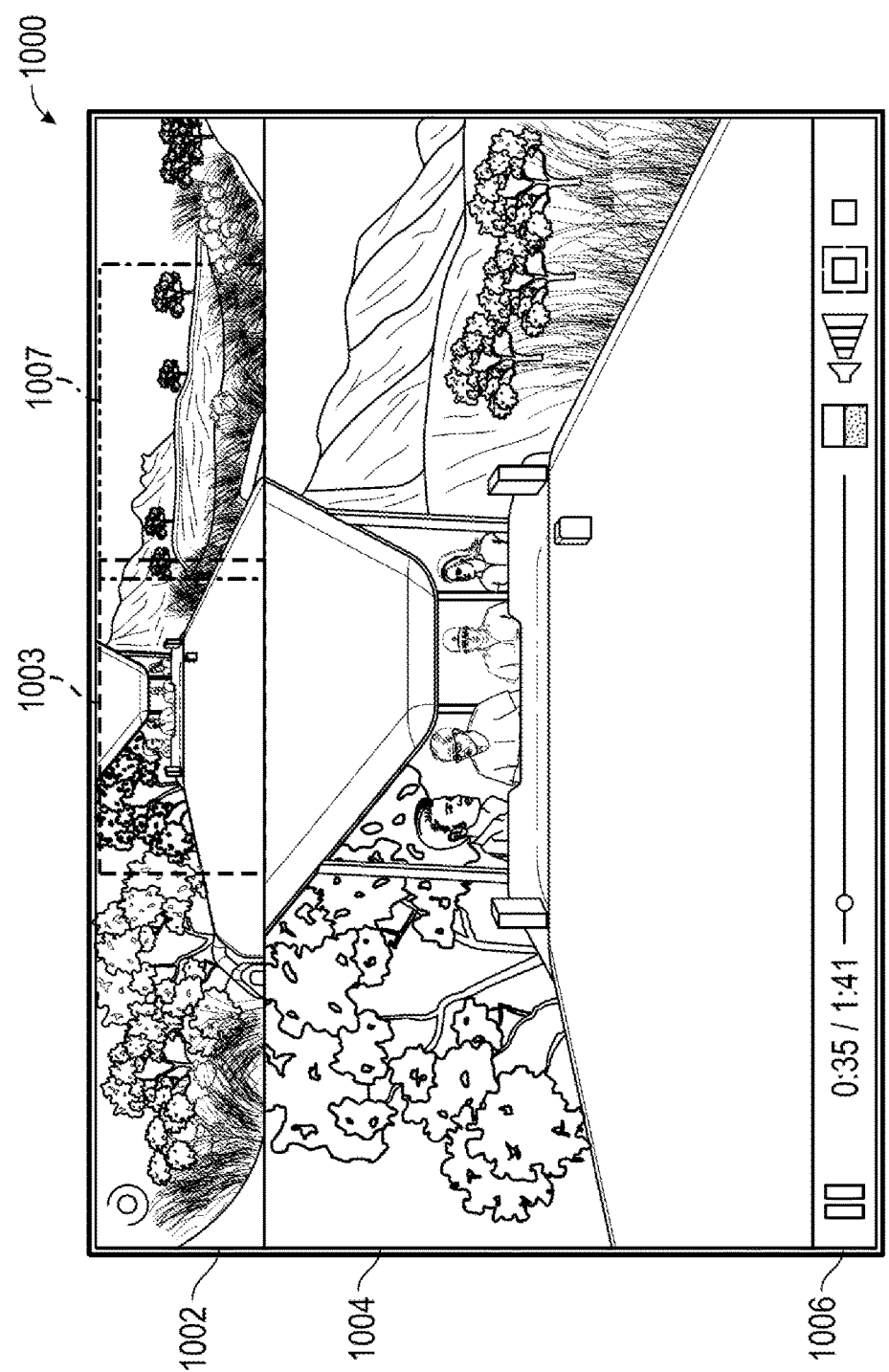
FIG. 14 is a screenshot showing another example of the interface of FIG. 11 including a suggested active field-of-view outline.

FIG. 14 is a screenshot showing another example of the interface 1000 including a suggested active field-of-view outline 1007. The suggested active field-of-view outline 1007 indicates a suggested active field-of-view (e.g., an active field-of-view that the user 36 may consider viewing). The suggested active field-of-view outline 1007 may be positioned on the thumbnail region 1002 similar to the active field-of-view outline 1003. The suggested active field-of-view indicated by the frame 1007 may be determined in any suitable manner. For example, the client device 32 and/or content provider 34 may aggregate the active fields-of-view selected by users 36 who have previously viewed the panoramic video. Aggregating may comprise, for example, finding an average location of the active fields-of-view within the full field-of-view, finding a median location of the active fields-of-view within the full field-of-view, or any other aggregation method. The location of the active field-of-view within the full field-of-view may comprise one position or a range of positions. The result of the aggregating may be a location in the full field-of-view. The suggested active field-of-view outline 1007 may be displayed at a location in the thumbnail field-of-view corresponding to the determined location in the full field-of-view. Also, in some examples, the location of the suggested active field-of-view outline 1007 may be selected by a single user 36 (e.g., a creator of the video) and/or based on computer analysis of the video.

Figure 15:
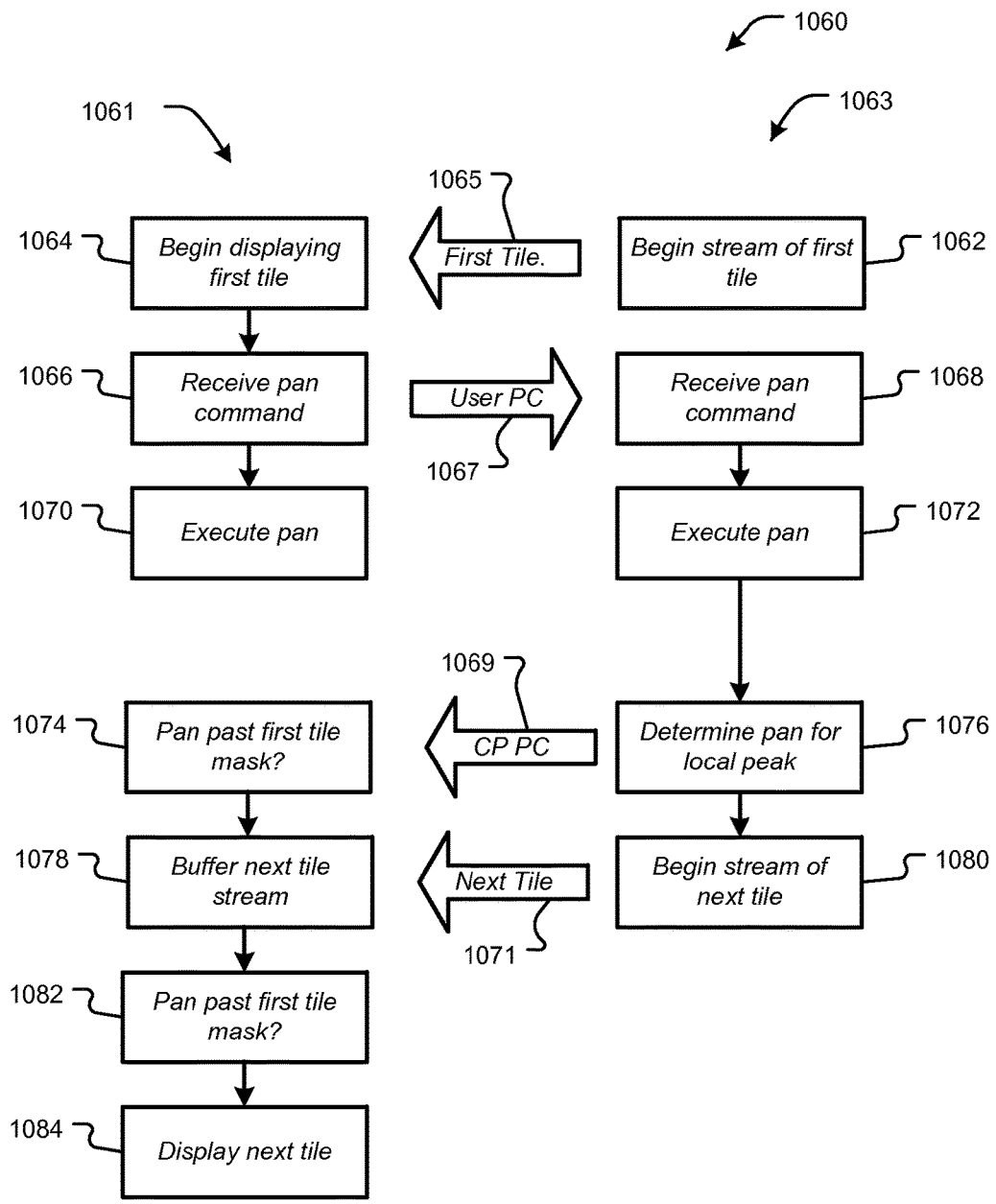
FIG. 15 is a flow chart showing one example of a process flow that may be executed by the content provider and client device to distribute and playback a panoramic video based on user input and a predetermined active field-of-view.

FIG. 15 is a flow chart showing one example of a process flow 1060 that may be executed by the content provider and client device to distribute and playback a panoramic video based on user input and a predetermined active field-of-view. In the process flow 1060, actions in column 1061 may be performed by the client device 32 (e.g., a viewer executed by the client device 32). Actions in column 1063 may be performed by the content provider 34. At 1062, the content provider 34 may begin to send a first tile 1065 to the client device 32. This may occur in response to any suitable stimulus including, for example, a request from the client device 32. The client device 32 may receive the first tile 1065 and may begin displaying the first tile 1065 at 1064 (e.g., after buffering). At 1066, the client device 32 may receive a pan command 1067 from the user 36 (e.g., a user pan command). The user pan command 1067 may be provided to the content provider 34, which may receive the user pan command 1067 at 1068. In addition to or in lieu of providing the pan command, the client device 32 may provide the content provider 34 with an indication of a current active field-of-view. The client device 32 and/or the content provider 34 may execute the user pan command 1067 at 1070 and/or 1072. The user pan command 1067 may be executed in any suitable manner, for example, as described herein with respect to FIGS. 6-8.

Figure 16:
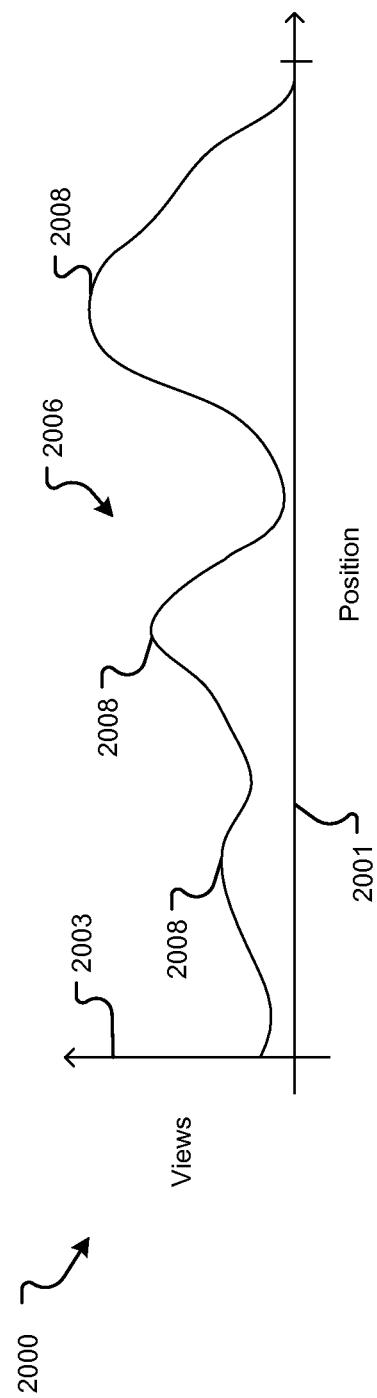
FIG. 16 is a chart showing one example of a distribution of active fields-of-view selected be previous viewers of a panoramic video.

At 1076, the content provider 34 may determine a pan command based on a local peak of a distribution of active fields-of-view (e.g., a distribution of active fields-of-view selected by previous viewers of the panoramic video). FIG. 16 is a chart 2000 showing one example of a distribution 2006 of active fields-of-view, for example, selected by previous viewers of a panoramic video. A horizontal axis 2001 indicates a position within the full field-of-view of the panoramic video. A vertical axis 2003 indicates a number of views of each potential active field-of-view within the full field-of-view. As shown, various points on the plot 2006 are local peaks 2008. For example, local peaks 2008 may correspond to areas of the panoramic video where the number of views are relatively higher than the number of views of surrounding positions. Referring back to FIG. 15, the content provider, at 1076, may select a content provider pan command 1069 that moves the active field-of-view to a nearby local peak 2008. The nearby local peak 2008 may be the closest local peak to the current active field-of-view, the closest local peak 2008 to the current active field-of-view in a particular pan direction, or any other suitable nearby local peak 2008. The content provider 34 may communicate the content provider pan command 1069 to the client device 32. The content provider pan command 1069, for example, may indicate a pan direction and a pan rate towards the nearby local peak 2008.

Upon execution by the client device 32, the pan command 1069, executed by the client device 32 at the pan rate, may cause the client device 32 to translate the active field-of-view to the nearby local peak 2008. The client device 32 may begin to execute the pan (e.g., within the first tile) at 1074. If the pan 407 will require a next adjacent tile, the content provider 34 may begin, at 1080, to transmit the next tile 1071. The client device 32 may receive the next tile 1071 and begin buffering the next tile 1071 at 1078. Because the active field-of-view is predetermined, the navigation position at which the visible field-of-view will shift to the next tile according to the predetermined field-of-view is known. This may be the buffer navigation position. The content provider 34 may calculate a buffer time, for example, as described herein. The content provider 34 may subtract the buffer time from the navigation position to determine when to begin streaming the next tile 1071 to the client device 32. At 1082, the client device 32 may translate the active field-of-view past the edge of the first tile. At 1084, the client device 32 may begin playing the next tile, for example, as described above with respect to 226 and 322. In various examples, distribution 2006 may be stored at the client device 32. In this way, the client device 32 may determine the nearby local peak 2008 and implement automatic pan commands to reach it. The pan commands may be executed, for example, as described herein with respect to FIGS. 6 and 7.

Figure 17:
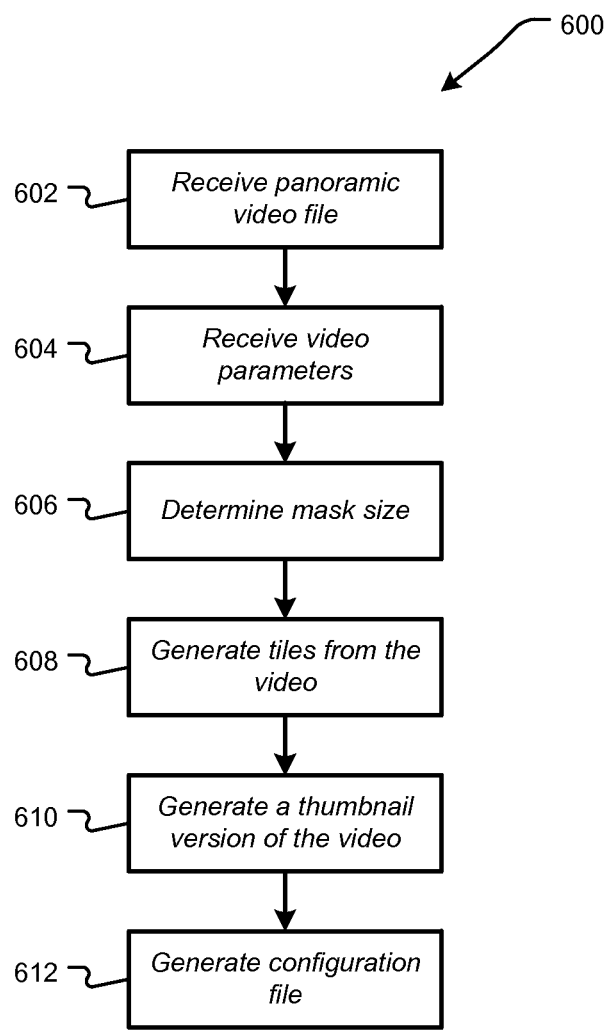
FIG. 17 is a flow chart illustrating one embodiment of a process flow for generating a panoramic video comprising tiles.

FIG. 17 is a flow chart illustrating one embodiment of a process flow 600 for generating a panoramic video comprising tiles. The process flow 600 is described as being executed by the content provider 34. In various examples, however, all or part of the process flow 600 may be executed by other components. For example, the process flow 600 may be executed by a dedicated server or servers that are not also involved in distributing the video to users 36 and client devices 32 as described herein. At 602, the content provider may receive a panoramic video file. The panoramic video file may have been generated in any suitable manner. For example, a camera system with multiple cameras may be used to capture concurrent video feeds. The concurrent video feeds may be stitched together after capture to create a seamless panoramic video file. In some examples, the content provider 34 is in communication with the cameras and can perform the stitching. Accordingly, receiving the panoramic video may comprise receiving portions of video from multiple cameras that the content provider 34 stitches into a panoramic video. In some examples, the content provider 34 does not perform the stitching and receiving the panoramic video may comprise retrieving the panoramic video from memory or another storage location associated with the content provider 34. For example, another computer system may perform stitching and/or the panoramic video may be captured using a camera system with specialized optics that are designed to capture very wide-angle fields-of-view. For example, some camera systems utilize mirrors or systems of mirrors to capture panoramic video.

At 604, the content provider 34 may receive parameters for creating the panoramic video. Example parameters may include a video height (in pixels), a width of the active field-of-view, a frame rate, an initial active field-of-view, and a tile overlap. A mask size may be received and/or may be determined by the content provider 34. Optionally, at 606, the content provider 34 may determine mask size. Generally, lower mask sizes lead to smaller tiles with less redundancy and faster transfer times. Lower mask sizes, however, can limit the pan rate available to the user 36. For example, as described herein, the maximum allowable pan rate may be based on the buffer time for the next adjacent tile and the width of the mask area. If a mask size is too small for network conditions, a requested pan command may be slowed or halted while the next adjacent tile is loaded. Accordingly, in some examples, the content provider 34 may select a mask size based on expected network conditions and/or a desired pan rate. Higher expected network speeds and lower expected network latencies may lead to smaller masks, while lower expected network speeds and higher expected network latencies may lead to larger masks. In some examples, mask width is set to prevent a user from panning the active field-of-view from the central area of a tile to the edge of the tile at a desired pan rate before an adjacent tile is buffered. In some examples, the mask width may be configurable by the content provider 34. In some examples, the content provider 34 may also receive a tile shift indicating a distance between the center points (or other equivalent points) of adjacent tiles.

At 608, the content provider 34 may generate tiles from the received video. The tiles may be generated utilizing the desired active field-of-view width, height, mask size, tile overlap, etc. In some examples, generating the tiles may include resizing some or all of the received panoramic video. The number of tiles generated may depend, for example, on the width of the received panoramic video, the tile overlap, and the width of the active field-of-view. In some examples, the content provider 34 may generate multiple versions of the tiles at different resolutions. For example, during playback, the content provider 34 and/or the viewer at the client device 32 may determine the resolution of tiles to be used, for example, based on current network conditions.

At 610, the content provider 34 may generate a thumbnail version of the panoramic video. The thumbnail version may be a resized video including the full field-of-view of the panoramic video. The thumbnail version may have a reduced resolution relative to the tiles and the original panoramic video file. Reduced resolution may be achieved in any suitable manner. For example, reduced resolution may be achieved by applying a suitable compression algorithm.

Optionally, at 612, the content provider 34 may generate a configuration file. The configuration file may be provided to the client device 32 viewer to indicate information regarding the panoramic video. Example information in the configuration file may include: a name for the video, a height for the video, a tile width, a mask width, a tile shift, a size of the video, a number of tiles in the video, etc. The configuration file may also comprise universal resource locations (URLs) or other suitable addresses indicating the location of the thumbnail version and the various tiles, at the various derived resolutions. The configuration file may be formatted according to any suitable syntax including, for example, Hypertext Markup Language (HTML), eXtensible Markup Language (XML), etc. An example configuration file is reproduced below:

```
[{"VideoName":"ThunderHill Demo",
"TileWidth":2560,
"MaskWidth":640,
"TileShift":640,
"VideoSize":3628,
"VideoHeight":720,
```
Above parameters define video file size, Tile size, and Mask size.
```
"TileCount":6,
"FirstTile":4,
```
Total number of Tiles the source video is to be broken down into is defined above. The number of Tiles varies by Tile size and Mask width. The First Tile defines the first area of the video stream that is shown to the user.
```
"QualitySwitchEnabled":1,
"LowDelayTreshold":1,
"LowDelayTiles":1,
"ThumbURL":"http://dtvmmfc0c86ev.cloudfront.net/ThunderHill-1min/ThunderHill-1min-encoded.webm",
"Tiles": [{
    "Format":"webm",
    "Sources": [
        {"ID":0,                          "URL":"http://
            dtvmmfc0c86ev.cloudfront.net/ThunderHill-1min/
            ThunderHill-1min-tile-1-encoded.webm", "Type":0,
            "Positions": [{"Begin":0,"End":2560}]},
        {"ID":1,                          "URL":"http://
            dtvmmfc0c86ev.cloudfront.net/ThunderHill-1min/
            ThunderHill-1min-tile-2-encoded.webm", "Type":0,
            "Positions": [{"Begin":640,"End":3200}]},
        {"ID":2,                          "URL":"http://
            dtvmmfc0c86ev.cloudfront.net/ThunderHill-1min/
            ThunderHill-1min-tile-3-encoded.webm", "Type":1,
            "Positions":     [{"Begin":1280,"End":3628},
            {"Begin":0,"End":212}]},
        {"ID":3,                          "URL":"http://
            dtvmmfc0c86ev.cloudfront.net/ThunderHill-1min/
            ThunderHill-1min-tile-4-encoded.webm", "Type":1,
            "Positions":     [{"Begin":1920,"End":3628},
            {"Begin":0,"End":852}]},
        {"ID":4,                          "URL":"http://
            dtvmmfc0c86ev.cloudfront.net/ThunderHill-1min/
            ThunderHill-1min-tile-5-encoded.webm", "Type":1,
            "Positions":     [{"Begin":2560,"End":3628},
            {"Begin":0,"End":1492}]},
        {"ID":5,                          "URL":"http://
            dtvmmfc0c86ev.cloudfront.net/ThunderHill-1min/
            ThunderHill-1min-tile-6-encoded.webm", "Type":1,
            "Positions":     [{"Begin":3200,"End":3628},
            {"Begin":0,"End":2132}]}
    ],
    "SourcesLowQuality": [
        {"ID":0,                          "URL":"http://
            dtvmmfc0c86ev.cloudfront.net/ThunderHill-1min/
            ThunderHill-1min-tile-1_low2.webm",  "Type":0,
            "Positions": [{"Begin":0,"End":2560}]},
        {"ID":1,                          "URL":"http://
            dtvmmfc0c86ev.cloudfront.net/ThunderHill-1min/
            ThunderHill-1min-tile-2_low2.webm",  "Type":0,
            "Positions": [{"Begin":640,"End":3200}]},
        {"ID":2,                          "URL":"http://
            dtvmmfc0c86ev.cloudfront.net/ThunderHill-1min/
            ThunderHill-1min-tile-3_low2.webm",  "Type":1,
            "Positions":     [{"Begin":1280,"End":3628},
            {"Begin":0,"End":212}]},
        {"ID":3,                          "URL":"http://
            dtvmmfc0c86ev.cloudfront.net/ThunderHill-1min/
            ThunderHill-1min-tile-4_low2.webm",  "Type":1,
            "Positions":     [{"Begin":1920,"End":3628},
            {"Begin":0,"End":852}]},
        {"ID":4,                          "URL":"http://
            dtvmmfc0c86ev.cloudfront.net/ThunderHill-1min/
            ThunderHill-1min-tile-5_low2.webm",  "Type":1,
            "Positions":     [{"Begin":2560,"End":3628},
            {"Begin":0,"End":1492}]},
        {"ID":5,                          "URL":"http://
            dtvmmfc0c86ev.cloudfront.net/ThunderHill-1min/
            ThunderHill-1min-tile-6_low2.webm",  "Type":1,
            "Positions":     [{"Begin":3200,"End":3628},
            {"Begin":0,"End":2132}]}
    ]
}]
}]
```

The example configuration file reproduced above describes a panoramic video entitled "ThunderHill Demo." TileWidth indicates that the video has a width of 2560 pixels. MaskWidth indicates that the mask width for the video is 640 pixels. TileShift indicates that the tile shift for the video is also 640 pixels. This may indicate that a viewer will be able to transition from one tile to an adjacent tile without keeping the first tile playing. In other words, the viewer may transition between adjacent tiles as described herein with respect to FIG. 4c. VideoHeight indicates that the height of the video is 720 pixels. VideoSize indicates that the total width of the video is 3628 pixels. Accordingly, the example panoramic video has dimensions of 720×3628 pixels. TileCount indicates that the video comprises six tiles. FirstTile indicates that the first tile to be shown to the user is tile number 4. For example, the initial active field-of-view may be the central area 16 (FIG. 1) of tile number 4. The example configuration file also includes addresses (e.g., Universal Resource Locations or URLs) for the thumbnail and each tile. Two addresses are provided for each tile, a first address for a high-resolution version of the tile and a second address for a low resolution version of the tile.

Figure 18:
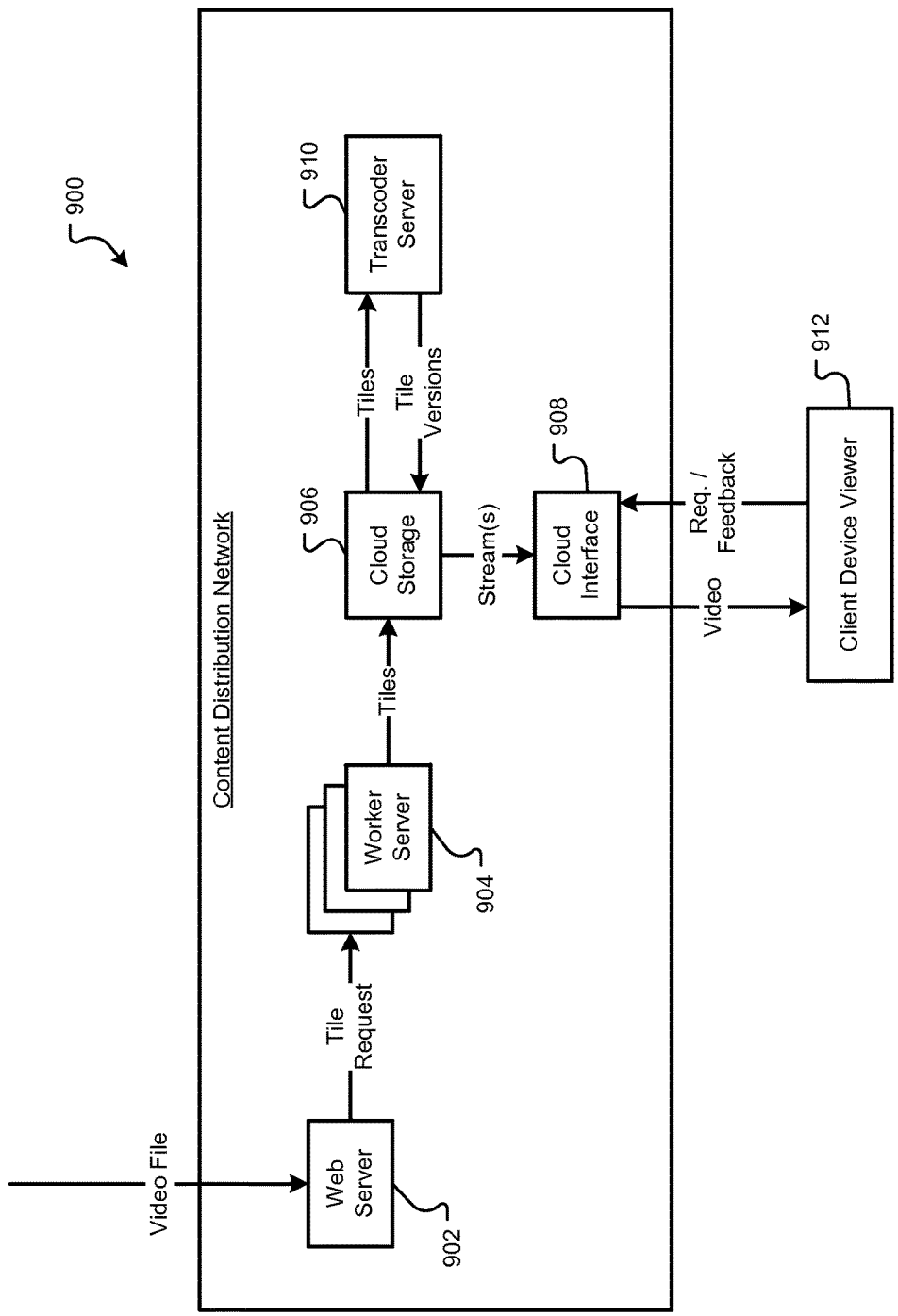
FIG. 18 is a diagram showing one example of a workflow for creating and distributing panoramic video utilizing a content delivery network.

In some examples, the content provider 34 may be and/or comprise a CDN comprising various servers and/or other computer devices configured to create and distribute panoramic video. FIG. 18 is a diagram showing one example of a workflow for creating and distributing panoramic video utilizing a CDN 900. A Web server 902 may receive a panoramic video file. The Web server 902 may forward the panoramic video file to one or more worker servers 904 along with a request to break the panoramic video file into tiles. The request may include, for example, some or all of the video parameters described herein above with respect to the process flow 600. The worker servers 904 may generate the tiles, as described herein. In some examples, worker servers 904 may also generate a thumbnail version of the video. The worker servers 904 may comprise any suitable type of server. In some examples, the worker servers 904 may be configured according to any suitable video process format. In some embodiments, the worker servers 904 may operate utilizing FFMPEG software.

After tiles are created, they may be pushed to a cloud storage 906. The cloud storage 906 may be any suitable system including, for example, the AMAZON S3 storage service available from AMAZON.COM, INC. The cloud storage 906 may push the tiles to a transcoder server 910. The transcoder server 910 may comprise one or more servers to convert the tiles into different versions. For example, the transcoder server 910 may generate versions of the tiles at different resolutions. The transcoder server 910 may also generate versions of the tiles according to different file formats. For example, versions of the tiles intended to be played by a viewer executed through the CHROME web browser from GOOGLE, INC. may be formatted according to the "webm" format while versions of the tiles intended to be played by a viewer executed through the INTERNET EXPLORER web browser available from the MICROSOFT CORPORATION may be formatted according to the mp4. In some examples, the transcoder server 910 is the AMAZON ELASTIC TRANSCODER available from AMAZON.COM, INC. through the AMAZON S3 storage service. In some examples, each tile (and optional thumbnail version) may be generated according to each supported resolution level according to each supported format. Generated tiles (and thumbnail versions) may be transmitted back to the cloud storage 906.

A client device viewer 912 may access the panoramic viewer through a cloud interface 908. The cloud interface 908 may be configured to permit the client viewer 912 to receive the video and provide analytics, for example, as described herein. In some examples, the cloud interface 908 may be the CLOUDFRONT available from AMAZON.COM, INC.

In various examples, the methods and systems described herein may allow for rapid loading of interactive high-resolution panoramic videos. By loading and buffering tiles instead of the complete panoramic video, bandwidth requirements can be reduced, sometimes dramatically. For example, a 360° HD panoramic video streamed utilizing the systems and methods herein may enjoy large reductions in required bandwidth including, for example, bandwidth reductions up to and including 75% as compared to streaming the entire panoramic video. Lower bandwidth requirements may allow larger potential audiences to stream and interact with panoramic videos.

In various examples described herein, reduced bandwidth requires may enable more efficient distribution of panoramic videos over "mesh" networks commonly deployed by the military and other users. For example, users may navigate through a panoramic field-of-view without overwhelming the bandwidth of the available network by trying to stream the full field-of-view of the video. Also, various examples described herein may allow panoramic video to be viewed on devices that do not have a large enough or fast enough memory to stream panoramic video. By breaking the video down into smaller, more manageable parts, a less-capable device may be able to stream high-resolution panoramic video.

Various examples are directed to systems and methods that allow for the rapid generation of three-dimensional maps using images from panoramic video systems. These images, when taken from a wide-angle video camera can be used to generate panoramic three-dimensional images by additional processing of the video data. For example, the methods described herein for generating three-dimensional images may be implemented by the content provider 34 and may be provided to the client device 32 for various uses.

Various examples for generating three-dimensional maps may be executed without the need for a stereoscopic pair of cameras or other range finding technology (e.g., LID to generate complete 3D images. It also does not require complex sensors such as LIDAR, laser range finders, acoustic range finders, etc. For example, some visual light three-dimensional cameras require at least a stereoscopic pair of cameras to capture a defined image and then the two images from those cameras can be used to create a 3D image.

A plurality of cameras can be used in various arrangements to allow for stereoscopic camera pairs to capture panoramic images, as described herein. In some examples the stereoscopic camera pairs may be used to generate panoramic videos that may be processed as described herein. Generating a three-dimensional panoramic video in this way, however, often requires a large number of wide-angle cameras and generates a large amount of data because there must be overlap between each pair of cameras for the full field-of-view.

Various examples reduce the total amount of imaging data required to create panoramic three-dimensional images, for example, by reducing the number of required cameras. Fewer cameras means reduced system size, weight, power requirements, cost, wireless bandwidth requirements, and complexity. Various examples allow for highly nuanced three-dimensional data to be produced because the three-dimensional data is being generated from multiple camera perspectives, not just a single perspective. Various examples allow for more complete panoramic data to be captured because camera orientation is flexible, reducing the likelihood of operator error.

By using the camera system's relative location in space, various examples can create a panoramic (e.g., 360°) three-dimensional image of fixed objects without requiring a stereoscopic pair of cameras throughout all of the field-of-view. According to various examples, three techniques may be used, either in conjunction with one another or separately.

Figure 19:
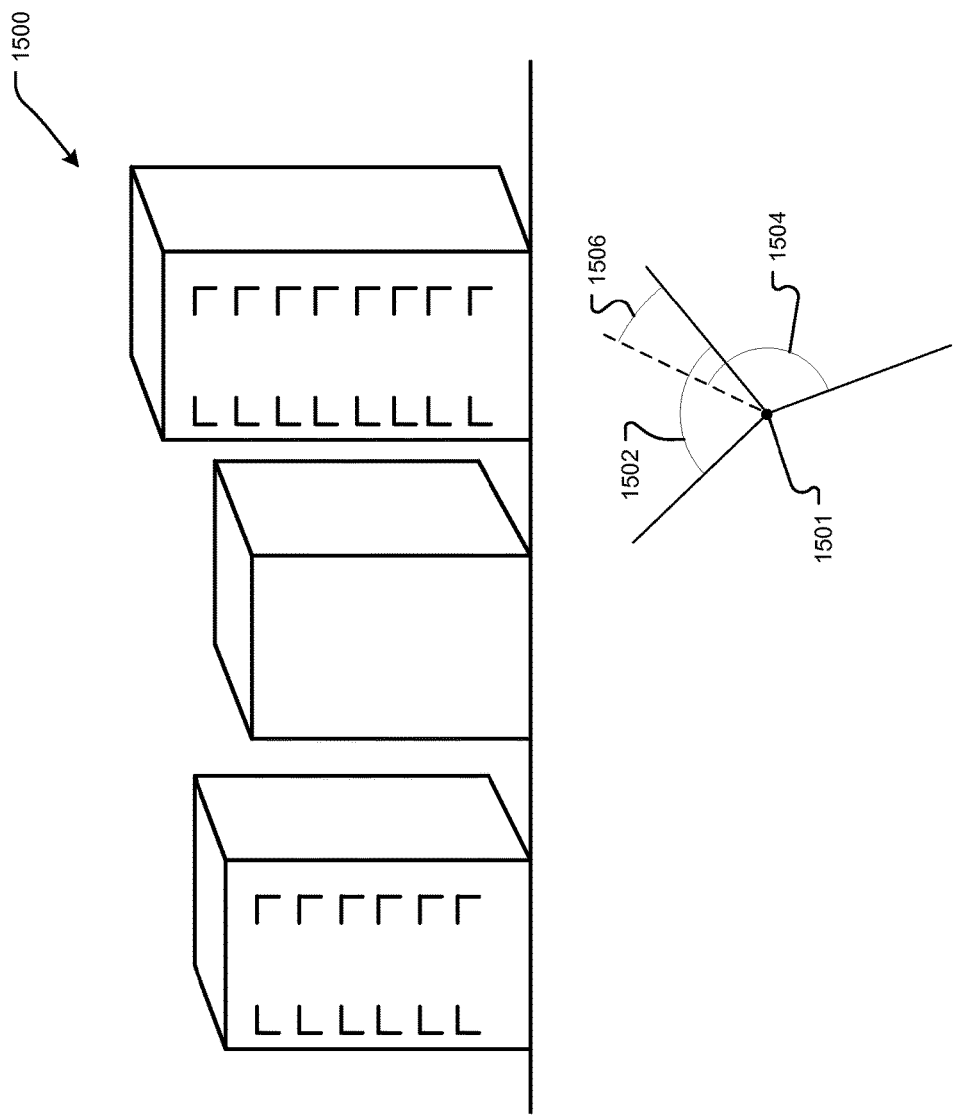
FIG. 19 shows one example of a scene and camera location viewing a scene illustrating an example technique for determining three-dimensional information.

According to a first example technique, three-dimensional images may be generated using a stereoscopic overlap between cameras. This overlap exists in the "seams" of the video system. For example, FIG. 19 shows one example of a scene 1500 and camera location 1501 viewing a scene 1500. The camera location 1501 comprises two cameras, Camera 1 and Camera 2, with overlapping fields-of-view. A Camera 1 field-of-view is indicated by 1502. A Camera 2 field-of-view is indicated by 1504. An overlap between the fields-of-view 1502, 1504 is indicated by 1506. Because the Camera 1 and Camera 2 on the 360° camera system are fixed relative to each other, the data in the region of overlap may be treated as data from a stereoscopic pair of cameras. This data can then be used to generate three-dimensional data using any suitable method.

According to a second example technique, two images may be captured from a single camera over a certain distance. For a panoramic camera system that is moving, either by person on foot, bicycle, car, aerial drone, or by some other means, the distance travelled over a specific amount of time will vary based on the speed that the camera is traveling. By recording panoramic video, a large number of frames may be captured over a fixed amount of time. For example, many video cameras can record at twenty-four (24) frames per second (fps), 30 fps, 60 fps, or higher. These high frame rates allow for a pair of images taken from the same camera within a short time to be considered as a "stereoscopic pair" of images. By taking images in rapid succession, images taken from a single camera at a point in time, t, and the next point in time, t+1, are captured relatively close together in terms of both time and physical position in space. Depending on frame rate and speed the camera is moving, images in sequence can be treated as a "stereoscopic pair" for the sake of creating a 3D map of static structures. For cameras that are moving more slowly, frames can be used from time, t, and t+N (where N is a number greater than 1), to allow for the desired change in physical distance between the two still images. Once the "stereoscopic pair" of images is available, this data can then be used to generate three-dimensional data using any suitable methods.

Figure 20:
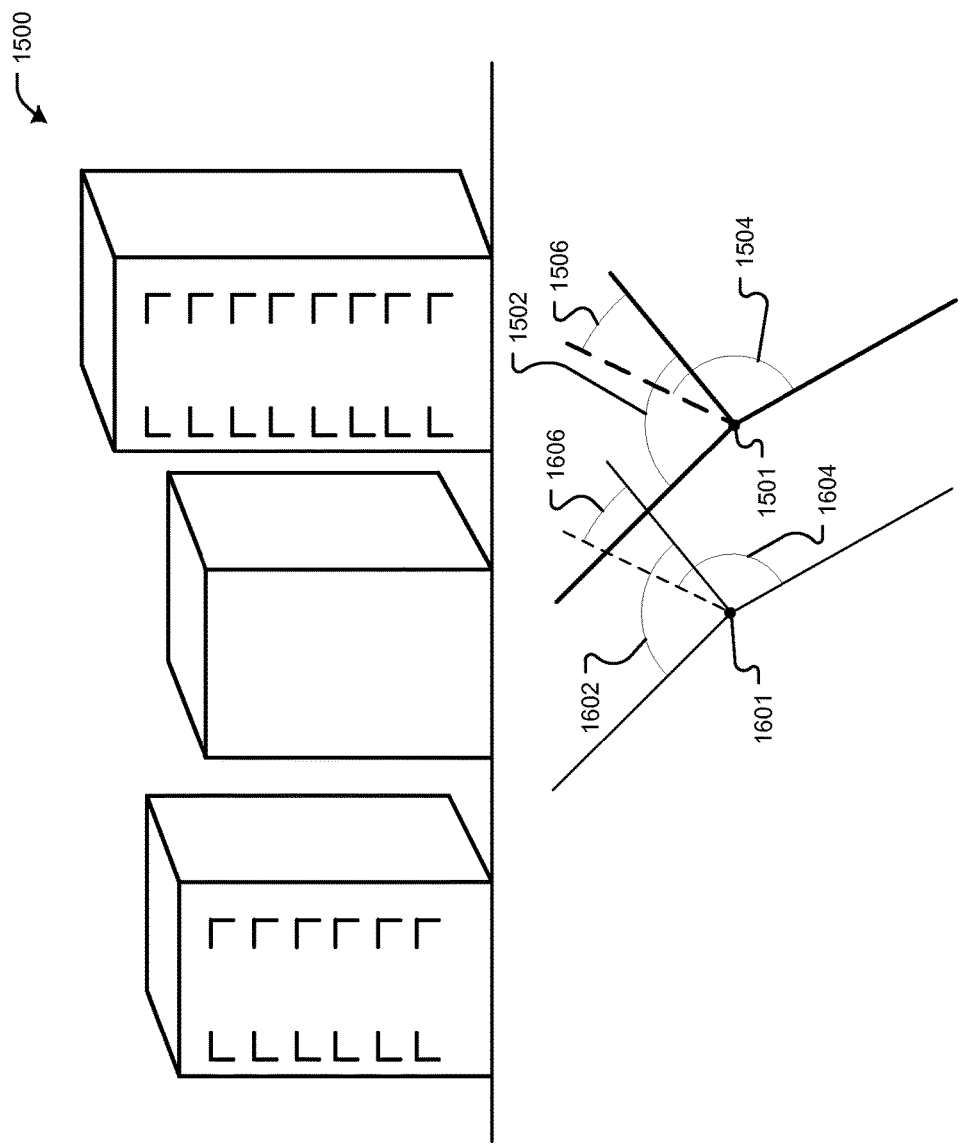
FIG. 20 shows the example scene of FIG. 19 demonstrating another example technique for determining three-dimensional information.

FIG. 20 shows the example scene 1500 demonstrating an example of the second technique. In this image, a camera is moving a known distance over a short period of time between two camera positions 1501 and 1601. This may allow for a "stereoscopic pair" of images to be created, with the first image taken at camera position 1501 and the second image taken at camera position 1601. In various examples, multiple cameras with overlapping fields-of-view may be used, as described with respect to FIG. 19. For example, a Camera 1 may have a field-of-view 1502 at the camera position 1501 and a field-of-view 1602 at the second camera position 1601. A Camera 2 may have a field-of-view 1504 at the first camera position 1501 and a second camera position 1604 at the second camera position 1601.

According to a third example technique, three-dimensional images may be generated by measuring how image data has changed after the panoramic camera has moved a fixed distance in space. By recognizing and measuring the delta in the size of fixed objects in the image, a three-dimensional image map of objects within the field-of-view may be generated. Because the panoramic video camera is capturing data all around the system at a given point in time, t, image data at time t+1 can be used to generate 3D data that are not possible using the two methods described above.

FIGS. 21a and 21b show scenes 1700 illustrating the third example technique. 1701 is an image of a building 1702 taken at a first distance 1708 from the building 1702, as illustrated in scene 1703. The image 1701 was taken with the camera at a camera position illustrated by 1704. 1703 is an image of the building 1703 taken at a second distance 1710 from the building 1702, as illustrated in scene 1705. The image 1703 was taken at a second camera position illustrated by 1706. As shown, the camera is moving away from a building from position 1704 to position 1706, thereby changing the camera's perspective of the building and allowing for three-dimensional data to be generated.

In various examples, some or all three of the example techniques described herein may be combined to generate panoramic three-dimensional images for a location at a point in time. Such three-dimensional images may have various different applications. For example, the images may be used to generate three-dimensional mapping of indoor and outdoor environments. The various examples described herein may be more cost effective than "street view" systems in current use because they can be implemented with basic panoramic cameras available at relative low costs. Also, in some examples, the orientation of the camera or cameras may not matter, because it is processing in 360°, no special equipment is needed, reducing cost and complexity of the system.

Because of the low cost and simplicity of data collection for the examples described herein, large numbers of users (human or automated systems) may use panoramic video cameras to regularly update three-dimensional maps. For example, panoramic video cameras could be given to the general public, or placed on vehicles such as taxis or delivery vehicles. Because these users cover large percentages of city streets, more complete and more up to date maps may become available. Also, in some examples, aerial drones may carry panoramic cameras and may be piloted around both indoor and outdoor environments to create updated 3D models of physical space. Further, in some examples, underwater drones with panoramic cameras may be piloted through complex environments and create 3D maps of underwater environments.

According to various examples, the techniques described herein may be utilized for rapid updating of three-dimensional maps for physical environments undergoing rapid change. These rapidly changing environments could be anywhere, but some examples would be urban areas of rapid construction or destruction, areas impacted by natural disasters, confined spaces of interest for search and rescue, war zones, etc. Further, in some examples, because the video cameras are capturing a panoramic view of image data in real time, images from the cameras can be overlaid onto a three-dimensional map creating more authentic virtual reality environments.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method for displaying a panoramic video, the method comprising:
    displaying an interface for viewing the panoramic video, wherein the interface comprises a focus region and a thumbnail region;
    displaying at the focus region an active field-of-view selected from a full field-of-view of the panoramic video; and
    displaying at the thumbnail region a thumbnail version of the panoramic video having a thumbnail field-of-view equivalent to the full field-of-view of the panoramic video, wherein a distribution of color saturation levels of the thumbnail version indicates a distribution of fields-of-view selectable from the full field-of-view, and wherein the distribution of fields-of-view selectable from the full field-of-view comprises a first field-of-view selected from the full field-of-view during a previous display of the panoramic video.

2. The method of claim 1, wherein the distribution of fields-of-view selectable from the full field-of-view comprises a plurality of fields-of-view selected from the full field-of-view during previous displays of the panoramic video.

3. The method of claim 2, wherein a color saturation level at a first position of the thumbnail version is proportional to a first value for the distribution of fields-of-view corresponding to the first position.

4. The method of claim 3, wherein a color saturation level at a second position of the thumbnail version is proportional to a second value for the distribution of fields-of-view corresponding to the second position, wherein the first value for the distribution of fields-of-view is higher than the second value for the distribution of fields-of-view, and wherein the color saturation level at the first position is higher than the color saturation level at the second position.

5. The method of claim 1, further comprising applying a color-gradient mask to the thumbnail version.

6. The method of claim 5, wherein the color-gradient mask indicates a color saturation level for each position in the thumbnail field-of-view, and wherein applying the color-gradient mask comprises modifying a color saturation level of a first pixel of the thumbnail version to match a color saturation level indicated by the color-gradient mask for a position of the first pixel.

7. The method of claim 1, further comprising displaying a field-of-view outline at the thumbnail region, wherein the field-of-view outline indicates a location within the thumbnail field-of-view of the active field-of-view displayed at the focus region.

8. The method of claim 1, wherein the interface further comprises a navigation region and further comprising displaying at the navigation region at least one tool configured to receive navigation input from a user.

9. The method of claim 1, wherein displaying the interface comprises:
    executing a browser; and
    executing a web application through the browser, wherein the thumbnail region and focus region are provided by the web application.

10. The method of claim 1, further comprising:
    receiving a translate command from a user, wherein the translate command indicates a translate direction for the active field-of-view; and
    translating the active field-of-view in the translate direction.

11. The method of claim 10, wherein receiving the translate command comprises receiving an indication that the user has selected and moved a point in the focus region.

12. The method of claim 10, wherein receiving the translate command comprises receiving an indication that the user has selected and shifted a field-of-view outline in the thumbnail region to a position indicating a new active field-of-view.

13. The method of claim 10, further comprising receiving from a content provider at least a portion of a first tile selected from a plurality of tiles of the panoramic video, wherein each tile of the plurality of tiles is a video having a tile field-of-view that is a portion of the full field-of-view of the panoramic video, and wherein displaying the active field-of-view comprises displaying the active field-of-view from the first tile.

14. The method of claim 13, further comprising:
    determining a buffer navigation position in a second tile selected from the plurality of tiles, wherein a second tile field-of-view is adjacent a first tile field-of-view in the translate direction, and wherein the buffer navigation position indicates a first frame in the second tile that can be displayed after the second tile is buffered;
    sending a request for the second tile, wherein the request comprises an indication of the buffer navigation position;
    receiving a portion of the second tile beginning from the buffer navigation position;
    buffering the second tile, wherein buffering the second tile comprises downloading a threshold number of frames of the second tile ahead of the buffer navigation position;
    translating the active field of view in the translate direction, wherein the active field-of-view reaches an edge of the first tile field-of-view; and
    displaying the active field-of-view from the second tile.

15. The method of claim 14, further comprising determining a translate rate limit, wherein the translate rate limit is a rate at which the active field-of-view can be translated in the translate direction without reaching the edge of the first tile field-of-view before the buffering of the second tile is complete.

16. The method of claim 1, further comprising displaying at the thumbnail region a suggested active field-of-view outline at a location in the thumbnail region indicating a suggested active field-of-view selected from the full field-of-view, wherein the suggested active field-of-view represents an aggregation fields-of-view from the distribution of fields-of-view selectable from the full field-of-view.

17. The method of claim 1, wherein the interface comprises a field-of-view icon, the field-of-view icon comprising an arc, wherein a subtending angle of the arc indicates the active field-of-view.

18. A computing device comprising at least one processor and a non-transitory computer readable medium storing instructions, wherein the instructions, when executed by the processor, cause the computing device to perform a method comprising:
  displaying an interface for viewing a panoramic video, wherein the interface comprises a focus region and a thumbnail region;
  displaying at the focus region an active field-of-view selected from a full field-of-view of the panoramic video; and
  displaying at the thumbnail region a thumbnail version of the panoramic video having a plurality of color saturation levels and a thumbnail field-of-view equivalent to the full field-of-view of the panoramic video, wherein the thumbnail version comprises a plurality of selectable regions, each of the plurality of selectable regions being displayed with one of a plurality of color saturation levels and corresponding to one of a plurality of fields-of-view selectable from the full field-of-view, wherein a first one of the plurality of fields-of-view selectable from the full field-of-view comprises a first field-of-view selected from the full field-of-view during a previous display of the panoramic video.

19. The computing device of claim 18, wherein the instructions, when executed by the processor, cause the computing device to perform the method further comprising:
  determining a first value for a first selectable region of the plurality of selectable regions of the thumbnail version, wherein the first selectable region is at a first position in the thumbnail version, wherein the first value represents a first number of times the first selectable region was selected as an active field of view during previous displays of the panoramic video;
  determining a second value for a second selectable region of the plurality of selectable regions of the thumbnail version, wherein the second selectable region is at a second position in the thumbnail version, wherein the second value represents a second number of times the second selectable region was selected as the active field of view during previous displays of the panoramic video, and wherein the first value is greater than the second value; and
  increasing a color saturation of at least one pixel in the first selectable region of the thumbnail version at the first position.

20. The computing device of claim 18, wherein the instructions, when executed by the processor, cause the computing device to perform the method further comprising:
  displaying a field-of-view outline at the thumbnail region, wherein the field-of-view outline indicates a location within the thumbnail field-of-view of the active field-of-view displayed at the focus region.

* * * * *